United States Patent
Liu et al.

(10) Patent No.: US 8,366,885 B2
(45) Date of Patent: Feb. 5, 2013

(54) WATER BODY SELF-GENERATING ELECTROLYTIC REDUCTION MODULE

(75) Inventors: Chen Pang Liu, Hsinchu (TW); Teh Ming Liang, Tainan County (TW); Bor Yu Hu, Taichung (TW); Chih Chun Chen, Hsinchu County (TW); Dong Yuan Lin, Taipei (TW); Wen Ping Lien, Taoyuan County (TW); Bo Yin Chu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 288 days.

(21) Appl. No.: 12/869,205

(22) Filed: Aug. 26, 2010

(65) Prior Publication Data

US 2011/0139609 A1    Jun. 16, 2011

(30) Foreign Application Priority Data

Dec. 15, 2009  (TW) .............................. 98142824 A
Apr. 21, 2010  (TW) .............................. 99112607 A

(51) Int. Cl.
*C25B 9/02*    (2006.01)
*C25B 9/04*    (2006.01)
*C25B 9/06*    (2006.01)
*C02F 1/461*   (2006.01)

(52) U.S. Cl. ................ 204/242; 204/286.1; 204/297.15; 205/742

(58) Field of Classification Search .................... 204/272
See application file for complete search history.

(56) References Cited

U.S. PATENT DOCUMENTS

| | | | | |
|---|---|---|---|---|
| 3,481,857 A * | 12/1969 | Gray | ............................ | 204/272 |
| 4,073,873 A * | 2/1978 | Caldwell et al. | ............ | 423/499.1 |
| 5,102,515 A * | 4/1992 | Ibbott | ............................ | 205/745 |
| 5,167,777 A * | 12/1992 | Kaczur et al. | ................ | 205/633 |
| 5,228,964 A * | 7/1993 | Middleby | ..................... | 204/194 |
| 5,234,555 A * | 8/1993 | Ibbott | ............................ | 422/22 |
| 5,603,844 A * | 2/1997 | Murphy et al. | ............... | 210/757 |
| 5,753,098 A * | 5/1998 | Bess et al. | ...................... | 205/501 |
| 5,861,087 A * | 1/1999 | Manning | ...................... | 204/272 |
| 6,328,896 B1 * | 12/2001 | Atnoor et al. | ................. | 210/669 |
| 2006/0144718 A1* | 7/2006 | Lambie | ........................ | 205/701 |

FOREIGN PATENT DOCUMENTS

| | | |
|---|---|---|
| CN | 1183383 A | 6/1998 |
| CN | 2669996 Y | 1/2005 |
| CN | 1775697 A | 5/2006 |

(Continued)

OTHER PUBLICATIONS

Korean Intellectual Property Office, "Office Action", Jun. 13, 2012, Korea.

*Primary Examiner* — Harry D Wilkins, III
(74) *Attorney, Agent, or Firm* — Morris Manning & Martin LLP; Tim Tingkang Xia, Esq.

(57) ABSTRACT

A water body self-generating electrolytic reduction module is applied to a water body containing oxidizing substances. The water body self-generating electrolytic reduction module includes a self-generating unit and an electrolysis unit. The self-generating unit is coupled to the electrolysis unit. When circulating in a water transmission pipeline, the water body drives the self-generating unit to generate an electric power and deliver the electric power to the electrolysis unit. Upon receiving the electric power, the electrolysis unit performs electrolysis on the water body circulating to the electrolysis unit, so that a reduction reaction occurs to the oxidizing substances in the water body.

21 Claims, 16 Drawing Sheets

FOREIGN PATENT DOCUMENTS

| | | |
|---|---|---|
| CN | 1931443 A | 3/2007 |
| CN | 300788394 | 6/2008 |
| CN | 201080886 Y | 7/2008 |
| CN | 300813380 | 8/2008 |
| CN | 201116508 Y | 9/2008 |
| CN | 201250134 Y | 6/2009 |
| JP | 07068264 | 3/1995 |
| JP | 10028979 | 2/1998 |
| JP | 2000153277 | 6/2000 |
| JP | 2004160443 A | 6/2004 |
| KR | 20080054093 A | 6/2008 |
| TW | 506481 | 10/2002 |
| TW | M247280 | 10/2004 |
| TW | M248787 | 11/2004 |
| TW | M254272 | 1/2005 |
| TW | M258986 | 3/2005 |
| TW | M267236 | 6/2005 |
| TW | M267237 | 6/2005 |
| TW | M269958 | 7/2005 |
| TW | M279401 | 11/2005 |
| TW | M284444 | 1/2006 |
| TW | M285848 | 1/2006 |
| TW | M286295 | 1/2006 |
| TW | M292682 | 6/2006 |
| TW | M294974 | 8/2006 |
| TW | M301694 | 12/2006 |
| TW | M308785 | 4/2007 |
| TW | M309455 | 4/2007 |
| TW | M314203 | 6/2007 |
| TW | 200812197 | 3/2008 |
| TW | M330861 | 4/2008 |
| TW | M337341 | 8/2008 |
| TW | M362851 U | 8/2009 |

* cited by examiner

WATER BODY SELF-GENERATING ELECTROLYTIC REDUCTION MODULE

CROSS-REFERENCE TO RELATED APPLICATIONS

This non-provisional application claims priority under 35 U.S.C. §119(a) on Patent Application No(s). 098142824 filed in Taiwan, R.O.C. on Dec. 15, 2009 and Patent Application No(s). 099112607 filed in Taiwan, R.O.C. on Apr. 21, 2010 the entire contents of which are hereby incorporated by reference.

BACKGROUND OF THE INVENTION

1. Field of Invention

The present invention relates to an electrolytic reduction module, and more particularly to a water body electrolytic reduction module having a self-generating capability.

2. Related Art

In the general transportation or storage process of a water body such as industrial water or domestic water, large amounts of substances harmful to human body such as bacteria, virus, or other microorganisms deteriorating the water quality exist due to the contamination of inorganic or organic substances in the transportation or storage environment. Taking common domestic water such as tap water, spring water, ground water, or well water for example, the domestic water is first transported from a water source through a transportation pipeline and stored in a reservoir, and then output from a water transmission pipeline connected to the reservoir to a water use end.

In order to make the domestic water reach a standard of suitability for use when being output to the water use end, a chemical drug (a bactericide or scale remover) is usually added to the water body in the reservoir periodically. For example, sodium hypochlorite is put into or chlorine gas is let into the water body, and the sodium hypochlorite or chlorine gas is oxidized in the water body, so that oxidizing substances such as free residual chlorine ($HOCl+OCl^-$) exist in the water body, thereby ensuring no bacteria breeding or follow-up harm for the water body before the use of the water use end. Although the free residual chlorine has sterilization and disinfection effect in the water body, a concentration of the free residual chlorine contained in the water body as high as about 2-3 ppm (mg/L) deteriorates the quality of the water body and gives the user a pungent odor specific to the free residual chlorine. Therefore, in consideration of the feeling of most people and the disinfection efficacy of the residual dose of the free residual chlorine, the World Health Organization (WHO) has recommended a concentration of free residual chlorine below 0.1 ppm as a reference stipulated in view of potability, and advised different countries to make adjustment by themselves according to different national conditions.

However, free residual chlorine standards stipulated in some countries are still above such stipulated reference. Moreover, in some parts or areas exposed to heavy rains, due to water source contamination, an average concentration of free residual chlorine contained in water bodies is increased by around 10 times, which is a high risk in life for human contacting and drinking despite the guarantee that the water bodies have a sterile quality. In addition, according to demonstrations of scientific research, free residual chlorine having high oxidizability may influence the human body through not only food intake but also skin absorption. To a slight extent, free residual chlorine may be acidified and destroy the protein in hair and skin so as to damage the hair and skin; to a serious extent, free residual chlorine may cause chronic diseases such as heart diseases, arteriosclerosis, and hypertension, allergy, and other symptoms to the human body.

In view of this, although an appropriate amount of free residual chlorine is really needed in the water body to achieve the effect of sterilization and disinfection on the water body, the concentration of the free residual chlorine and other oxidizing substances contained in the water body must be reduced to the lowest or the free residual chlorine and other oxidizing substances contained in the water body must be removed from the water body as much as possible when the water body is transported to the water use end through the water transportation pipeline, so as to avoid harm to the human body.

In current methods for removing the free residual chlorine or other oxidizing substances in the water body, a filtering (or water purification) device is usually installed between the reservoir and the water use end, so that a water body containing a oxidizing substances (for example, free residual chlorine) first circulates to the filtering device and the oxidizing substances are adsorbed by adsorbents filled in the filtering device, for example, the oxidizing substances are adsorbed by or reacted with porous ceramic balls, activated carbon, or other chemical agents, so as to be removed from the water body.

However, in the use of the conventional filtering device, since the filtering device has a complex structure and occupies a certain volume, the filtering device can only be installed in some specific areas for use, for example, mostly installed in an accommodating space below a water tank in ordinary houses for filtering drinking water. Thus, the filtering device cannot be widely applied to other water transportation equipment due to the limitation of its own volume.

In addition, the adsorbents filled in the filtering device may contaminate the quality of the water body after long-term contact with the water body, and thus need to be replaced periodically. Moreover, an operating power supply must be provided additionally for smooth operation of the filtering device, so the use cost of the filtering device is increased greatly, and excessive energy consumption is caused.

SUMMARY OF THE INVENTION

In view of the above problems, the present invention is a water body self-generating electrolytic reduction module, used for improving a conventional water body purification device for filtering (or removing) oxidizing substances in a water body, alleviating the current status that a conventional device has a complex structure and a large volume and requires an additional power supply for operation, solving the problems of excessively high cost, difficult assembly, and excessive energy consumption existing in not only manufacturing and production but also use of conventional water body purification equipment, and meanwhile eliminating the doubt that adsorbents and/or chemical agents contaminate the water quality since the conventional water body purification device needs to use the adsorbents and/or add the chemical agents to remove the oxidizing substances in the water body.

The present invention further provides a water body self-generating electrolytic reduction module, which is applied to a water transmission pipeline having a water body containing oxidizing substances circulating therein. The water body self-generating electrolytic reduction module comprises a self-generating unit and an electrolysis unit. The self-generating unit has a blade and generates an electric power when the blade rotates. The self-generating unit and the electrolysis unit are respectively arranged in the water transmission pipeline, and the electrolysis unit is coupled to the self-generating unit. When circulating in the water transmission pipeline, the water body drives the blade of the self-generating unit to rotate and generate an electric power. Upon receiving the electric power, the electrolysis unit performs electrolysis on the water body circulating to the electrolysis unit, so that a reduction reaction occurs to the oxidizing substances in the water body.

In the water body self-generating electrolytic reduction module disclosed in the present invention, the self-generating unit and the electrolysis unit are arranged in a water transmission pipeline, the self-generating unit is driven by the flow of a water body containing oxidizing substances to be processed in the water transmission pipeline to generate an electric power, and the electrolysis unit is actuated by the electric power, so as to remove the oxidizing substances in the water body or reduce a concentration of the oxidizing substances by the electrolysis unit.

Since the water body self-generating electrolytic reduction module in the present invention can remove (or reduce) oxidizing substances in a water body without providing an additional electric power or adding other adsorbents and/or chemical agents, the consumption of external power supply can be effectively reduced and the problem of water quality contamination resulting from the use of adsorbents and chemical agents is avoided. Moreover, due to the self-generating characteristics and simple structural constitution of the water body self-generating electrolytic reduction module, the water body self-generating electrolytic reduction module can be widely installed (applied) in various environments lacking power supplies, so as to enhance the applicability and convenience in use of the water body self-generating electrolytic reduction module.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The water body self-generating electrolytic reduction module disclosed in the present invention may be arranged in a water transmission pipeline for home or industrial use or any pipeline for transporting a water body so as to reduce a content of or remove an oxidizing substance contained in the water body transported by the water transmission pipeline. The oxidizing substance may be, but not limited to, perchloric acid ($HClO_4$), chloric acid ($HClO_3$), chlorous acid ($HClO_2$), hypochlorous acid (HClO), hydrogen dioxide, peracetic acid, sodium sulfite ($Na_2SO_3$), sodium bisulphate ($NaHSO_3$), sodium sulfide ($Na_2S$), sodium hyposulfaite ($Na_2S_2O_3$), or other impurities easily forming oxides in the water body, or acid groups and compound salts generated after dissociation of $HClO_4$, $HClO_3$, $HClO_2$, and HClO.

Figure 1:
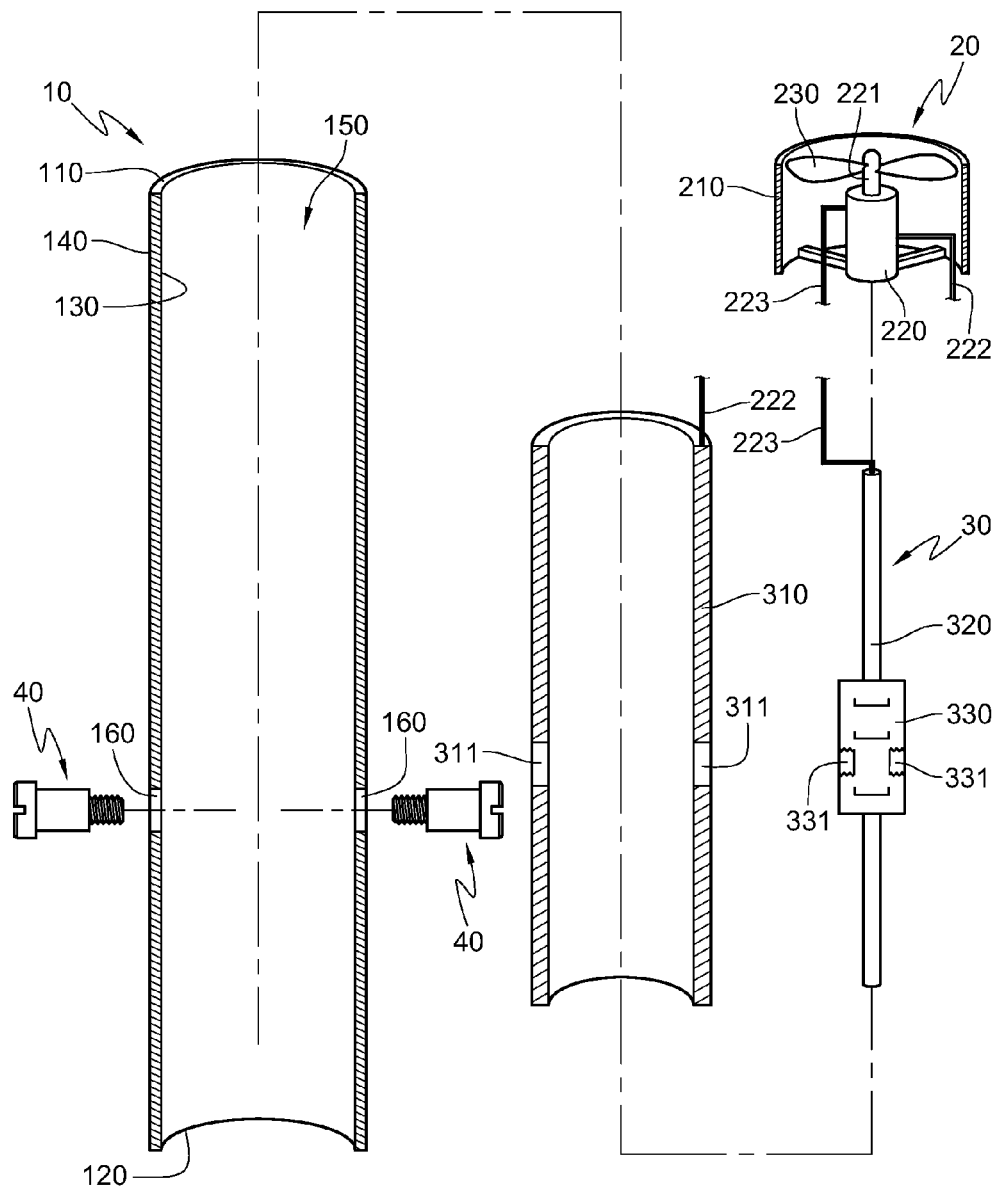
FIG. 1 is a schematic exploded view of a first embodiment of the present invention.
Figure 2:
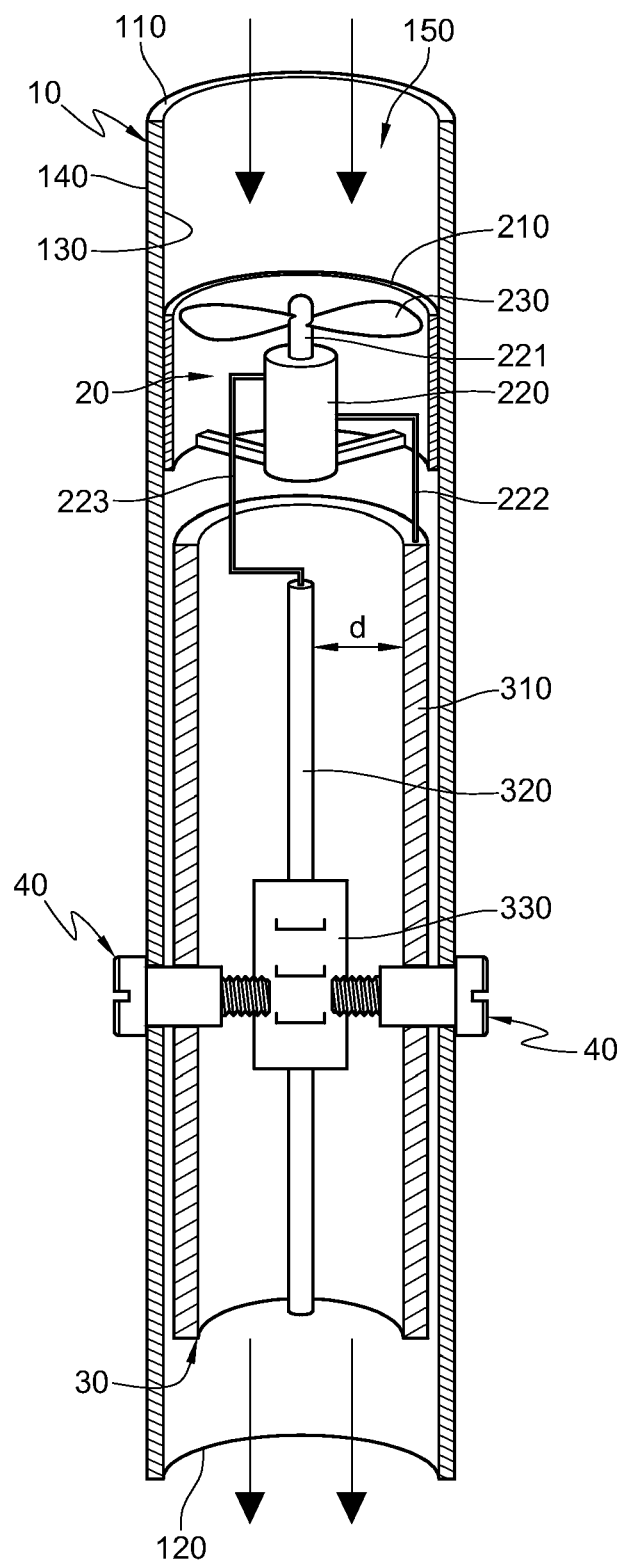
FIG. 2 is a schematic assembly view of the first embodiment of the present invention.

As shown in FIGS. 1 and 2, a water body self-generating electrolytic reduction module disclosed in a first embodiment of the present invention comprises a self-generating unit 20, an electrolysis unit 30, and a plurality of fixing members 40. The self-generating unit 20 comprises a first case and the electrolysis unit 30 comprises a second case, the first case is connected with the second case to form a hollow tube 10. The hollow tube 10 has a first end 110, a second end 120, an inner wall surface 130, an external surface 140, and an accommodating space 150. The inner wall surface 130 and the external surface 140 are located on two opposite sides of the hollow tube 10, and respectively extend from the first end 110 to the second end 120. A plurality of combination holes 160 running through the inner wall surface 130 and the external surface 140 is provided in the hollow tube 10.

The self-generating unit 20 is arranged at a position adjacent to the first end 110, while the electrolysis unit 30 is arranged at a position adjacent to the second end. The arrangement positions of the self-generating unit 20 and the electrolysis unit 30 in the accommodating space 150 may also be such that the self-generating unit 20 is adjacent to the second end 120 and the electrolysis unit 30 is adjacent to the first end 110. In the first embodiment, the arrangement in which the self-generating unit 20 is adjacent to the first end 110 and the electrolysis unit 30 is adjacent to the second end 120 is taken for illustration, but the present invention is not limited thereto.

The self-generating unit 20 has a frame 210, a body 220, and a blade 230. An outside diameter of the frame 210 matches an inside diameter of the hollow tube 10, so that the frame 210 may tightly press against the inner wall surface 130 of the hollow tube 10 and is fixed in the accommodating space 150 when being arranged in the accommodating space 150 inside the hollow tube 10. In addition, a plurality of ribs (or bumps) is disposed on an external surface of the frame 210 and corresponding trenches (or grooves) (not shown) are disposed on the inner wall surface 130, so that the frame 210 can be fixed in the accommodating space 150 by embedding the ribs in the trenches.

The body 220 has a stator, a rotor, and a rectifier circuit module (not shown) therein. The stator is connected to the rectifier circuit module, and has an induction coil. The rotor has a permanent magnet, and is movably inserted in the induction coil. The body 220 further has a rotary shaft 221, a negative lead 222, and a positive lead 223. One end of the rotary shaft 221 is movably inserted in the body 220 and connected to the rotor, and the other end of the rotary shaft 221 protrudes from the body 220 and is connected to the blade 230. The blade 230 may be configured as a screw blade or turbine blade. The negative lead 222 and the positive lead 223 each have one end connected to the rectifier circuit module of the body 220, and the other end connected to the electrolysis unit 30.

Figures 3, 4:
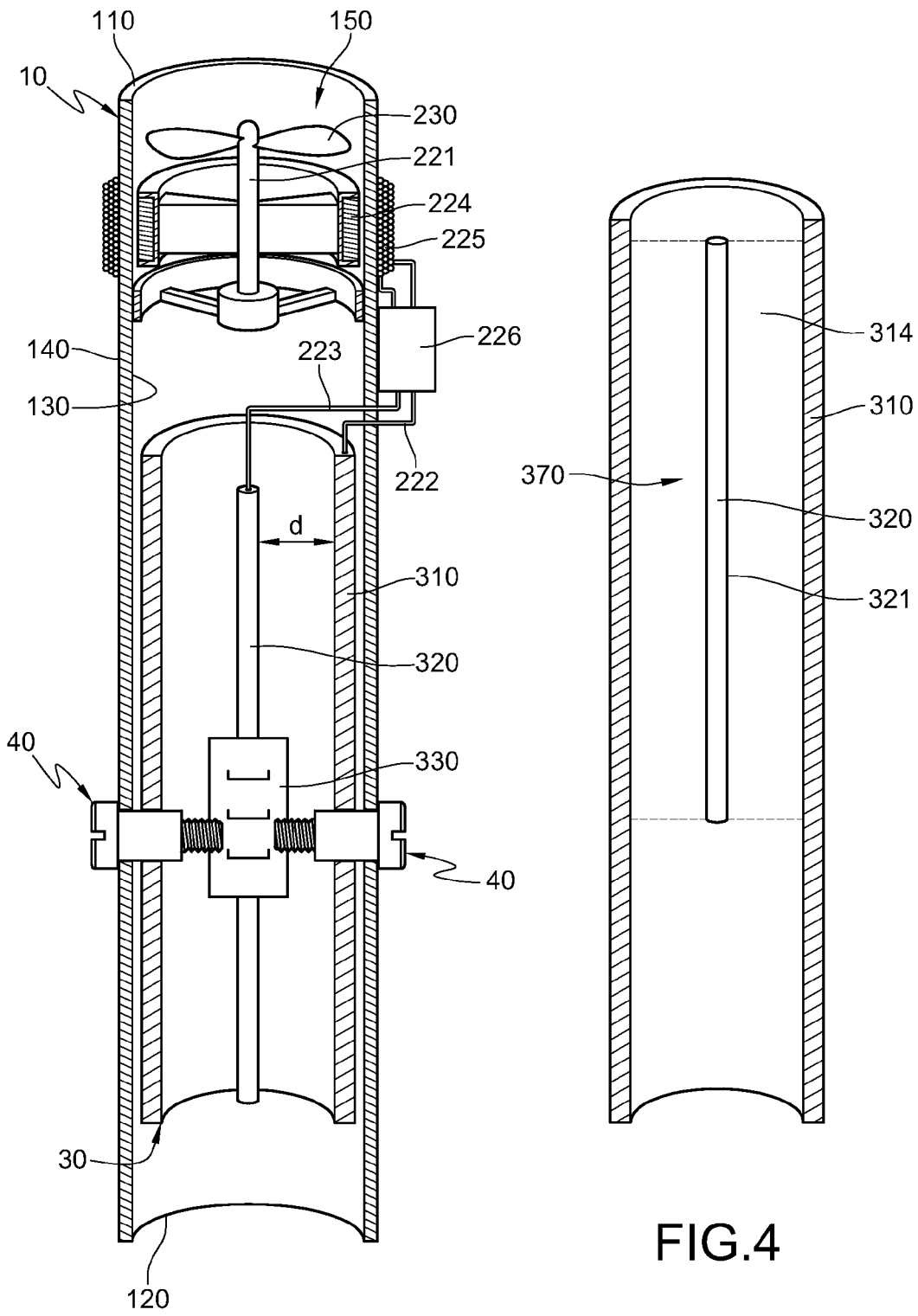
FIG. 3 is a schematic assembly view illustrating an induction coil of a self-generating unit disposed on an external surface of a hollow tube in the first embodiment of the present invention.
FIG. 4 is a schematic cross-sectional view illustrating an area of an electrolysis unit capable of performing electrolysis in the present invention.

The self-generating unit 20 drives the rotary shaft 221 to rotate by the blade 230, so that the rotor rotates relative to the stator, thus generating an electric power in a magnetic power generation manner, and the electric power is converted into a direct current by the rectifier circuit module and then output to the electrolysis unit 30 through the negative lead 222 and the positive lead 223. In addition, as shown in FIG. 3, in other embodiments of the present invention, in the disposal that the self-generating unit 20 generates an electric power by a permanent magnet 224 and an induction coil 225, the induction coil 225 may be wrapped on the external surface 140 of the hollow tube 10 and the permanent magnet 224 may be disposed on the rotary shaft 221 and close to the inner wall surface 130 of the hollow tube 10, and the permanent magnet 224 is corresponding to the induction coil 225. Moreover, a rectifier circuit module 226 is disposed on the external surface 140 of the hollow tube 10, and the induction coil 225 is coupled to the rectifier circuit module 226 and is coupled to the electrolysis unit 30 through the rectifier circuit module 226. Therefore, when rotating, the rotary shaft 221 drives the permanent magnet 224 to rotate relative to the induction coil 225, so as to generate an electric power, and the electric power is output to the rectifier circuit module 226 and transferred to the electrolysis unit 30 through the rectifier circuit module 226.

Since the principle of magnetic power generation in which the permanent magnet and the induction coil interact to generate the electric power and the structural setup of the self-generating unit belong to the conventional art, the detailed structure and operating principle thereof will not be described herein again.

Referring to FIGS. 1 and 2, the electrolysis unit 30 has a cathode portion 310, an anode portion 320, and a jacket 330. The cathode portion 310 is coupled to the negative lead 222 of the self-generating unit 20, and the anode portion 320 is coupled to the positive lead 223 of the self-generating unit 20. A material constituting the cathode portion 310 may be, but not limited to, a stainless steel material with an international number 316 or above, graphite, or other materials to which a reduction reaction easily occurs. A material constituting the anode portion 320 may be, but not limited to, platinum, a platinized metal, or other materials to which an oxidation reaction easily occurs, such as iridium, ruthenium, and palladium. A gap d exists between the cathode portion 310 and the anode portion 320. The cathode portion 310 and the anode portion 320 may be respectively configured as a plate-like structure and a columnar structure, or both plate-like structures, or the cathode portion and/or the anode portion have (has) a strip-shaped, spiral shaped, multiturn-like, multisheet-like, wave-shaped, or net-shaped configuration. An overall surface area of the cathode portion 310 is maximized and an overall surface area of the anode portion 320 is minimized.

The cathode portion 310 and the anode portion 320 respectively have an effective reaction area 314, 321. The effective reaction area 314 of the cathode portion 310 and the effective reaction area 321 of the anode portion 320 are respectively surface areas of the cathode portion 310 and the anode portion covered in an area 370 capable of performing electrolysis between the cathode portion 310 and the anode portion 320 (as shown in FIG. 4). In addition, a ratio between the effective reaction area 314 of the cathode portion 310 and the effective reaction area 321 of the anode portion 320 is between 4.5:1 and 10:1, especially less than 8:1, so as to enhance the electrolysis efficiency of the electrolysis unit 30.

This embodiment takes the cathode portion 310 being a cathode plate having a plate-like structure and the anode portion 320 being an anode bar having a columnar structure for illustration, but the present invention is not limited thereto. The cathode portion 310 is annularly disposed in the accommodating space 150 along the inner wall surface 130 of the hollow tube 10, and located between the anode portion 320 and the inner wall surface 130 of the hollow tube 10. The cathode portion 310 has a plurality of through holes 311 respectively corresponding to the plurality of combination holes 160 of the hollow tube 10. The anode portion 320 passes through and is fixed on the jacket 330, and the jacket 330 further has a plurality of fixing holes 331.

In the arrangement of the electrolysis unit 30, the fixing members 40 sequentially pass through the combination holes 160 of the hollow tube 10 and the through holes 311 of the cathode portion 310, and then pass through and are fixed in the fixing holes 331 of the jacket 330, so that the electrolysis unit 30 is fixed in the accommodating space 150 and the anode portion 320 is clamped by the fixing members 40 to be suspended in the accommodating space 150. Although this embodiment takes two fixing members 40 fixing the electrolysis unit 30 in the accommodating space 150 of the hollow tube 10 for illustration, in other embodiments of the present invention, the electrolysis unit 30 may also be fixed in the accommodating space 150 by passing only one fixing member 40 through the combination hole 160 of the hollow tube 10 and the through hole 311 of the cathode portion 310 sequentially, and then passing the fixing member 40 through and fixing it in the fixing hole 331 of the jacket 330. The above is merely different fixing ways of arranging the electrolysis unit 30 in the hollow tube 10, instead of limitation of the present invention.

The position of the anode portion 320 may be adjusted by using the fixing members 40 of different lengths, so that the anode portion 320 is located at a center of a circle formed by the surrounding of the cathode portion 310 (i.e., the equal gap d is maintained between the anode portion 320 and the cathode portion 310), or the anode portion 320 is offset from the center of the circle formed by the surrounding of the cathode portion 310. Moreover, the fixing members 40 may be in the form of screws, bolts, or studs for clamping and fixing the electrolysis unit 30 in the hollow tube 10. Meanwhile, a washer or O-ring (not shown) may be selectively fitted on the fixing member 40 to increase closeness between the fixing member 40 and the external surface 140 of the hollow tube 10.

Figure 5:
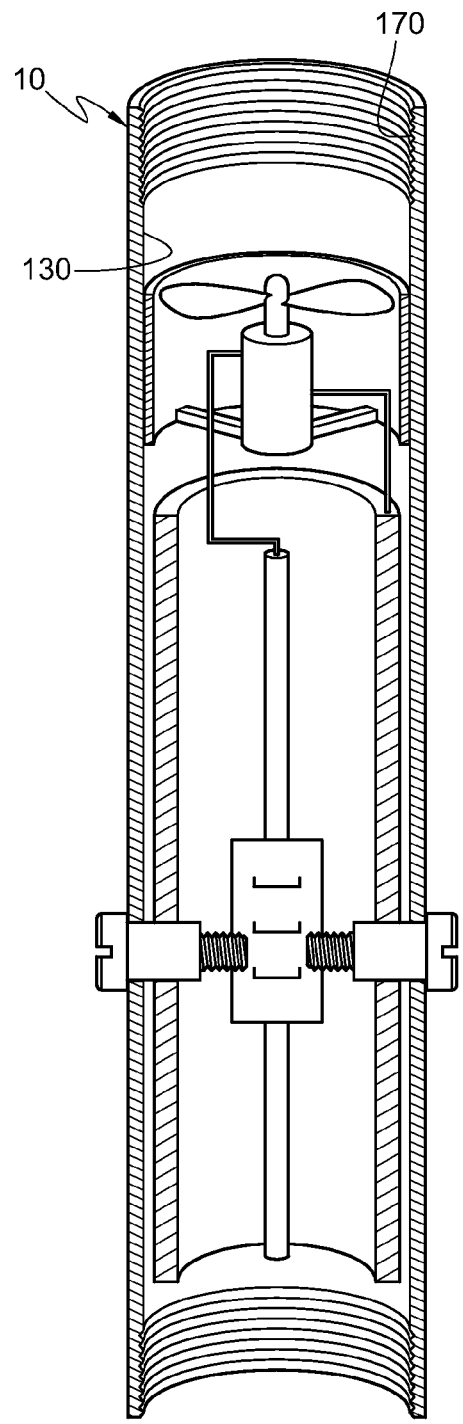
FIG. 5 is a schematic cross-sectional view illustrating the hollow tube having threads on an inner wall surface in the first embodiment of the present invention.
Figure 6:
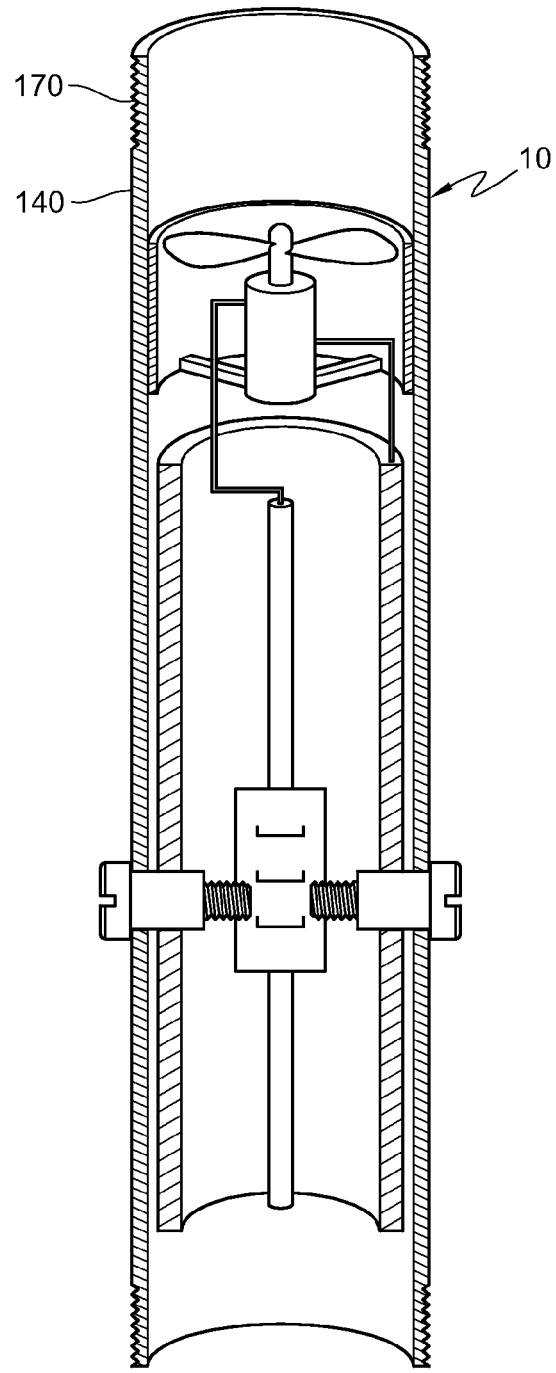
FIG. 6 is a schematic cross-sectional view illustrating the hollow tube having threads on then external surface in the first embodiment of the present invention.

As shown in FIG. 2, in the application of the water body self-generating electrolytic reduction module, the water body self-generating electrolytic reduction module is directly connected in series to a water transmission pipeline (not shown), for example, fitted on the first end 110 (or the second end 120) of the hollow tube 10 by a rubber hose, so that the water body self-generating electrolytic reduction module is connected in series to a water outlet of a water tap, or as shown in FIGS. 5 and 6, the water body self-generating electrolytic reduction module is connected in series to a water transmission pipeline by disposing a plurality of threads 170 on the inner wall surface 130 or the external surface 140 of the hollow tube 10 adjacent to the first end 110 and/or the second end 120 and engaging the plurality of threads 170 with threads of the water transmission pipeline made of a hard material such as plastic or metal (not shown). In addition, the hollow tube 10 having threads 170 on the inner wall surface 130 and the hollow tube 10 having threads 170 on the external surface 140 may first be engaged with each other, and then the water body self-generating electrolytic reduction module is connected in series to a water transmission pipeline. The above is merely different ways of joining the water body self-generating electrolytic reduction module to the water transmission pipeline, but not intended to limit the present invention. A structural size of the water body self-generating electrolytic reduction module may also be adjusted according to a pipe diameter of the water transmission pipeline to which the module is to be connected, so as to fabricate various water body self-generating electrolytic reduction modules of different sizes.

This embodiment takes the water body self-generating electrolytic reduction module applied to a ½ inch pipe (not shown) for general home use and used for removing free residual chlorine (HOCl+OCl$^-$) contained in a water body for illustration. A length of the hollow tube 10 of the water body self-generating electrolytic reduction module is about 14 centimeters (cm), and a diameter of the hollow tube 10 is equal to that of the ½ inch pipe (about 1.6 cm). A length of the cathode portion 310 and the anode portion 320 of the electrolysis unit 30 is about 10 cm, and a diameter of the cathode portion 310 is about 1.2 cm.

As shown in FIG. 2, in operation, when the water body (not shown) containing the free residual chlorine flows from the first end 110 of the hollow tube 10 into the accommodating space 150 through the transportation of the hollow tube 10, the water body containing the free residual chlorine impacts the blade 230 of the self-generating unit 20 and drives the blade 230 to rotate at the same time, so as to drive the self-generating unit 20 to generate an electric power. Moreover, an output power of the self-generating unit 20 is increased with the increase of a flow rate of the water body containing the free residual chlorine.

Figure 8:
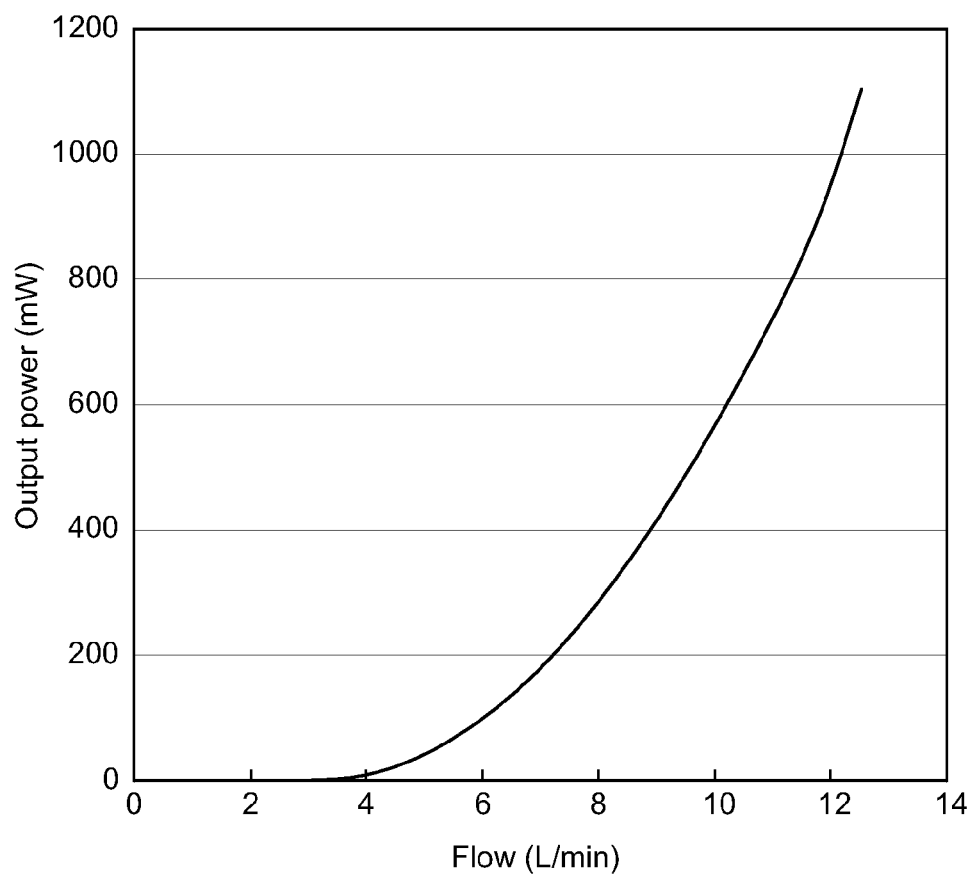
FIG. 8 is a schematic view illustrating an output power in the first embodiment of the present invention.

Referring to FIG. 8, when the flow rate of the water body containing the free residual chlorine is increased from an initial flow rate of 0 L/min to 12.5 L/min, the output power of the electric power generated by the self-generating unit 20 is increased from 0 mW to near 1100 mW. A relation between the flow rate (x) of the water body and the output power (y) of the self-generating unit may be obtained through a polynomial regression operation, as shown in the following Equation I:

$$y = 12.323x^2 - 80.906x + 135.39 \qquad \text{Equation I}$$

Thereby, when the flow rate of the water body exceeds 6.6 L/min, an electric quantity of 139 mW required for the electrolysis unit to perform an electrolytic reduction on the free residual chlorine can be supplied.

Figures 9, 10:
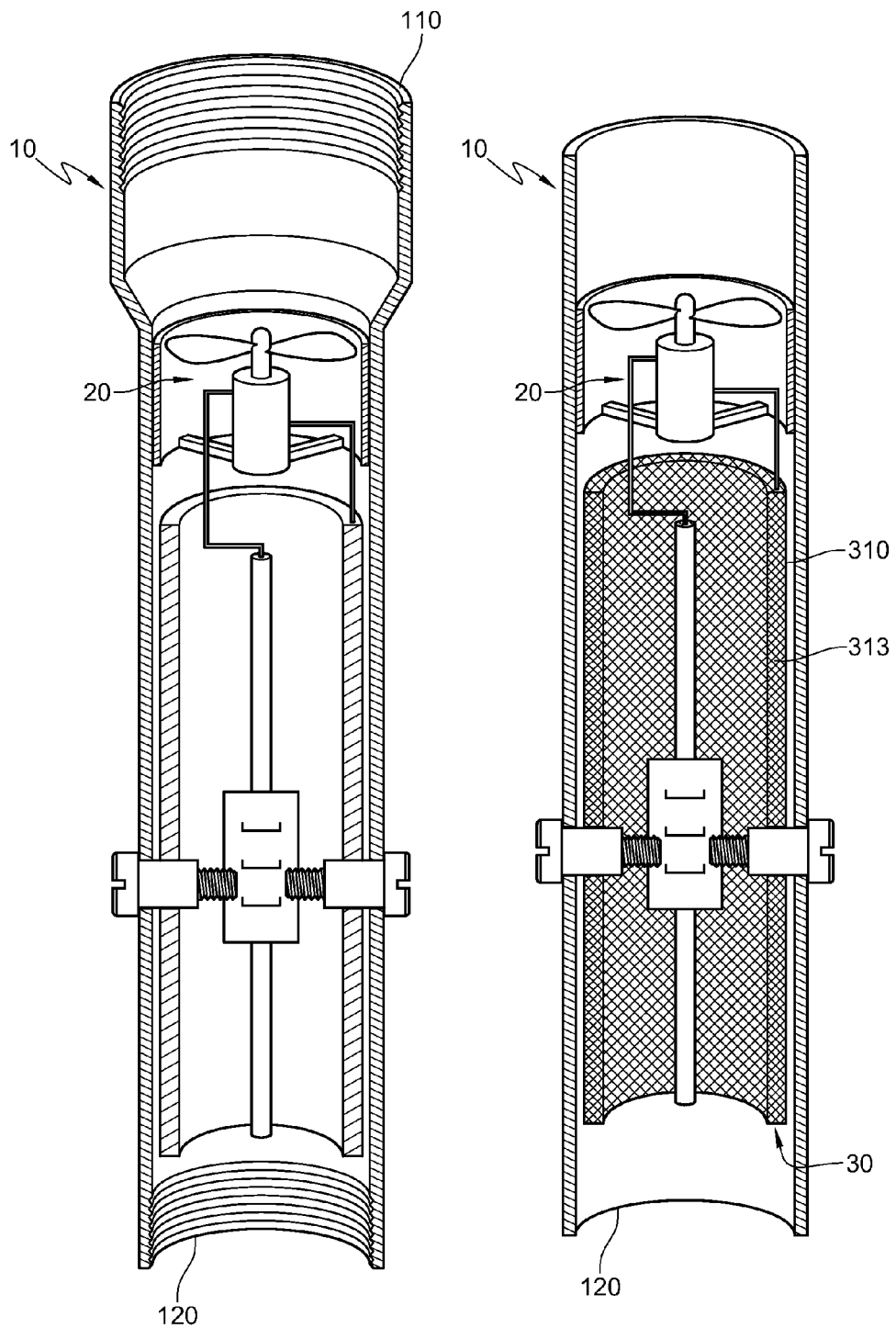
FIG. 9 is a schematic cross-sectional view illustrating the hollow tube having different diameters in the first embodiment of the present invention.
FIG. 10 is a schematic cross-sectional view illustrating a cathode portion having a mesh structure in the first embodiment of the present invention.

Since the electric power generated by the self-generating unit 20 is proportional to the flow rate of the water body containing the free residual chlorine, the electric power generated by the self-generating unit 20 may be increased by changing a coil density of the induction coil of the stator in the self-generating unit 20; or, as shown in FIG. 9, the electric power generated by the self-generating unit 20 may also be raised by increasing the tube diameter of the first end 110 of the hollow tube 10 or disposing the hollow tube 10 in the form of a Venturi tube so as to increase the flow rate for the water body containing the free residual chlorine to circulate to the self-generating unit 20.

Then, after the electric power is output to the electrolysis unit 30 through the negative lead 222 and the positive lead 223 and is received by the cathode portion 310 and the anode portion 320 of the electrolysis unit 30, electrolysis is performed, so that when the water body containing the free residual chlorine circulates to the electrolysis unit 30, a reduction reaction occurs to the free residual chlorine contained in the water body at the cathode portion 310 to form chloride ions which are stable and difficult to harm human body, thereby reducing the content of the free residual chlorine in the water body. When the water body containing the free residual chlorine is acid water, the oxidation-reduction reaction equation thereof is shown as follows:

When the water body containing the free residual chlorine is alkaline water, the oxidation-reduction reaction equation thereof is shown as follows:

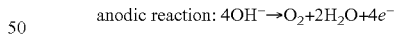
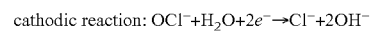
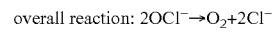

Figure 7:
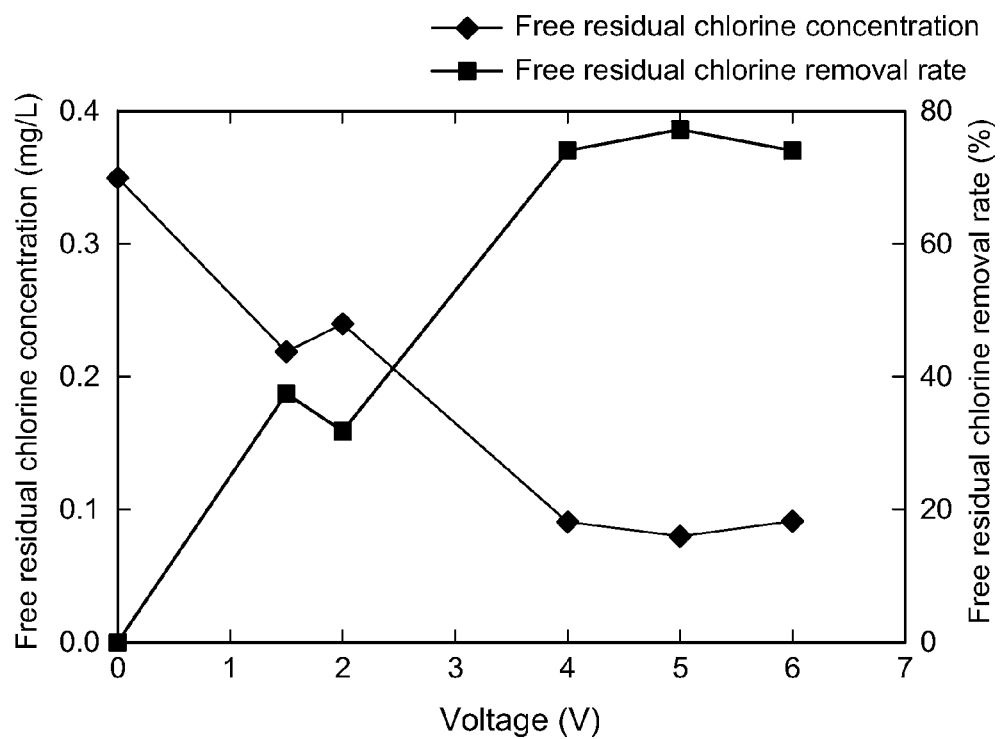
FIG. 7 is a schematic view illustrating a removal rate of free residual chlorine in the first embodiment of the present invention.

If a removal rate of the free residual chlorine is further tested, reference is made to FIG. 7. When the electrolysis unit 30 electrolyzes the water body containing the free residual chlorine with a voltage of 1.5 volts (V) to 6 V after receiving the electric power of the self-generating unit 20, a concentration of the free residual chlorine in the water body may fall from about 0.36 ppm to below 0.1 ppm. That is to say, after the water body containing the free residual chlorine circulates through the water body self-generating electrolytic reduction module, the removal rate of the free residual chlorine in the water body may reach the level of about 40% to 80%, and especially when the voltage of the electrolysis unit 30 reaches 4 V or above, the removal rate of the free residual chlorine can even be maintained at around 80%. Thus, it is proved that the water body self-generating electrolytic reduction module has good removal efficiency for the oxidizing substance in the water body.

In addition, since the electrolytic reduction of the free residual chlorine is accomplished at the cathode portion 310 of the electrolysis unit 30, the cathode portion 310 may further be configured as a mesh structure (as shown in FIG. 10) having a plurality of meshes 313, or a plurality of pores (not shown) may be opened in the cathode portion 310. Therefore, after the water body containing the free residual chlorine contacts with the self-generating unit 20, the flowing path of the water body containing the free residual chlorine in the hollow tube 10 may be in the electrolysis unit 30 and through the space between the electrolysis unit 30 and the hollow tube 10, all through the space inside the electrolysis unit 30, all through the space inside the electrolysis unit 30 and then out to the space between the electrolysis unit 30 and the hollow tube 10 through the plurality of meshes or pores in the cathode portion 310. The removal efficiency of the free residual chlorine is improved by increasing a contact area between the cathode portion 310 and the water body containing the free residual chlorine. Thereby, when the water body containing the free residual chlorine flows out from the second end 120 of the hollow tube 10, the concentration of the free residual chlorine contained in the water body is greatly reduced under the electrolysis of the electrolysis unit 30, so that the degree of harm of the free residual chlorine existing in the water body to the human body is reduced to the lowest.

Figure 11:
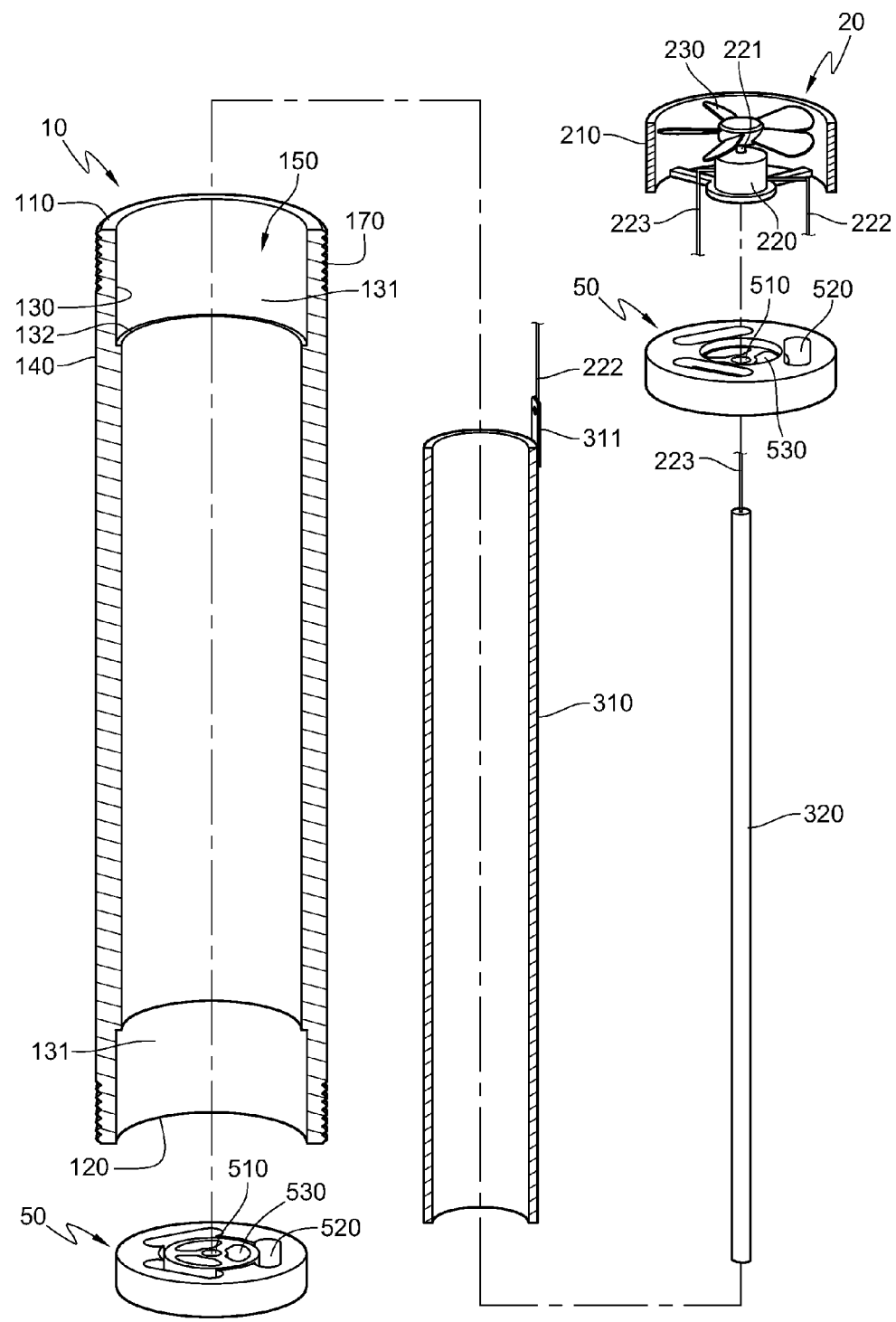
FIG. 11 is a schematic exploded view of a second embodiment of the present invention.
Figure 12:
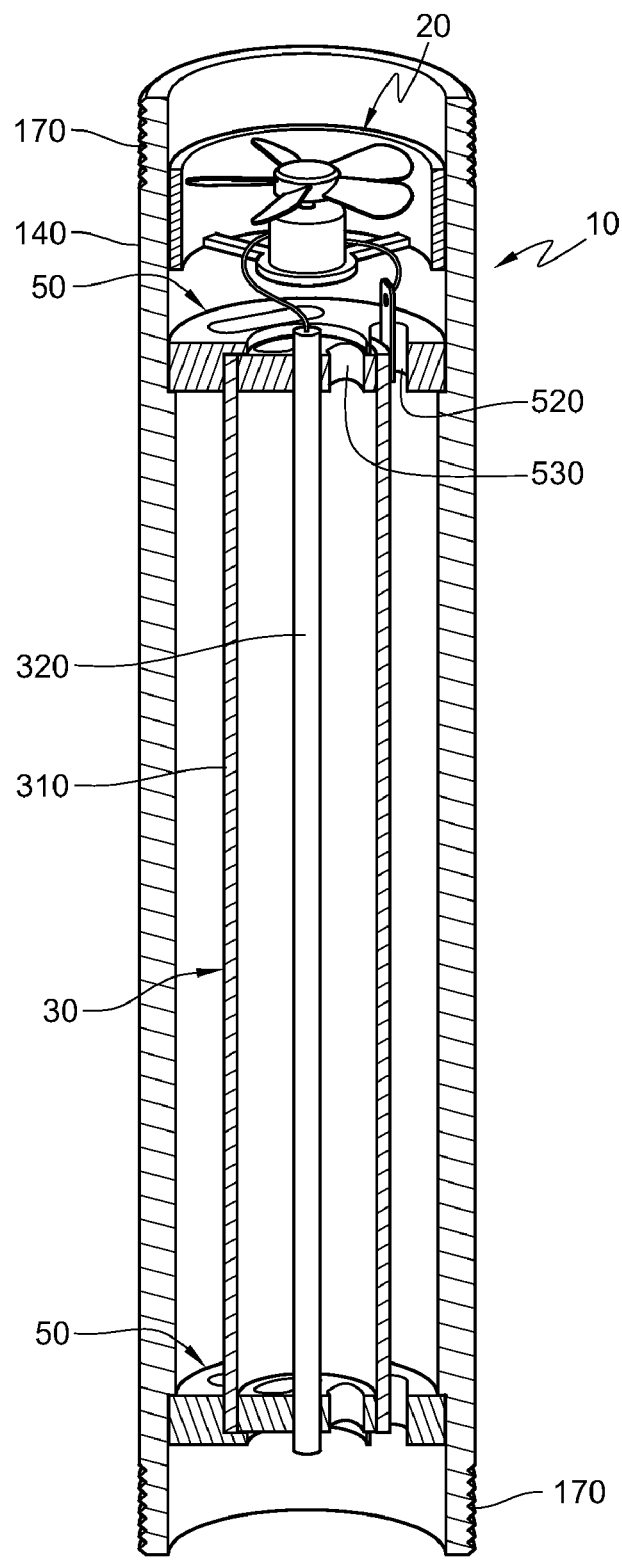
FIG. 12 is a schematic assembly view of the second embodiment of the present invention.

FIGS. 11 and 12 are a schematic exploded view and a schematic assembly view of a second embodiment disclosed in the present invention. Structures and operating principles of the second and first embodiments disclosed in the present invention are substantially the same, and only the difference there-between is illustrated below.

In the second embodiment of the present invention, a plurality of threads 170 is disposed on an external surface 140 of the hollow tube 10 adjacent to the first end 110 and the second end 120, so that the module is connected in series to a water transmission pipeline by engaging the plurality of threads 170 with threads of the water transmission pipeline made of a hard material such as plastic or metal (not shown). An inner wall surface 130 of the hollow tube 10 has a combination portion 131 at positions adjacent to the first end 110 and the second end 120 respectively. Moreover, a diameter of the two combination portions 131 is greater than that of other areas in the hollow tube 10, so that a leaning face 132 (as shown in FIG. 11) is formed at a position where the combination portion 131 is connected to other areas.

The self-generating unit 20 is arranged at the combination portion 131 adjacent to the first end 110, and an outside diameter of a frame 210 of the self-generating unit 20 matches a diameter of the combination portion 131, so that the self-generating unit 20 may be pressed and fixed to the combination portion 131 by the frame 210. The electrolysis unit 30 is arranged at a position adjacent to the second end 12. In this embodiment, a cathode portion 310 of the electrolysis unit 30 is a cathode plate having a plurality of meshes, and an anode portion 320 is an anode bar having a columnar structure. Moreover, a conductive strip 312 is provided at an end of the cathode plate 310 opposite to the self-generating unit 20 for coupling to a negative lead 222 of the self-generating unit 20, an a positive lead 223 of the self-generating unit 20 is coupled to the anode portion 320 of the electrolysis unit 30.

The second embodiment of the present invention further comprises two stoppers 50. The two stoppers 50 have an oval support ring structure, and an outside diameter thereof matches the diameter of the combination portions 131 of the hollow tube 10. When the two stoppers 50 are respectively disposed at the two combination portions 131, the two stoppers 50 lean against the leaning faces 132, and are fixed in the hollow tube 10 with their outside faces pressing against the combination portions 131. In addition, the two stoppers 50 may also be adhered to the combination portions 131 by an adhesive (not shown), or matching trenches and ribs (not shown) are respectively disposed on the stoppers 50 and the combination portions 131 so as to fix the stoppers 50 on the combination portions 131 by embedding the ribs in the trenches. The above is merely different combination ways of fixing the stoppers 50 to the combination portions 131, but not intended to limit the present invention.

When the two stoppers 50 are arranged in the hollow tube 10, one stopper 50 is located between the self-generating unit 20 and the electrolysis unit 30, and the other stopper 50 is located at the other side of the electrolysis unit 30 opposite to the self-generating unit 20.

A side face of each stopper 50 opposite to the self-generating unit (or the electrolysis unit) has a perforation 510, a plurality of positioning holes 520, and a plurality of flow holes 530 which all run through the stopper 50. The perforation 510 is disposed at a central position of the stopper 50, and the plurality of positioning holes 520 and the plurality of flow holes 530 surround the perforation 510. When the water body (not shown) flows from the first end 110 towards the second end 120 of the hollow tube 10, the water body circulates in the hollow tube 10 through the plurality of positioning holes 520 and the plurality of flow holes 530. Moreover, when the electrolysis unit 30 is fixed by the two stoppers 50, two ends of the anode portion 320 of the electrolysis unit 30 respectively pass through and are fixed in the perforations 510 of the two stoppers 50, and two ends of the cathode portion 310 respectively pass through and are fixed in the positioning holes 520 of the two stoppers 50.

Figure 13:
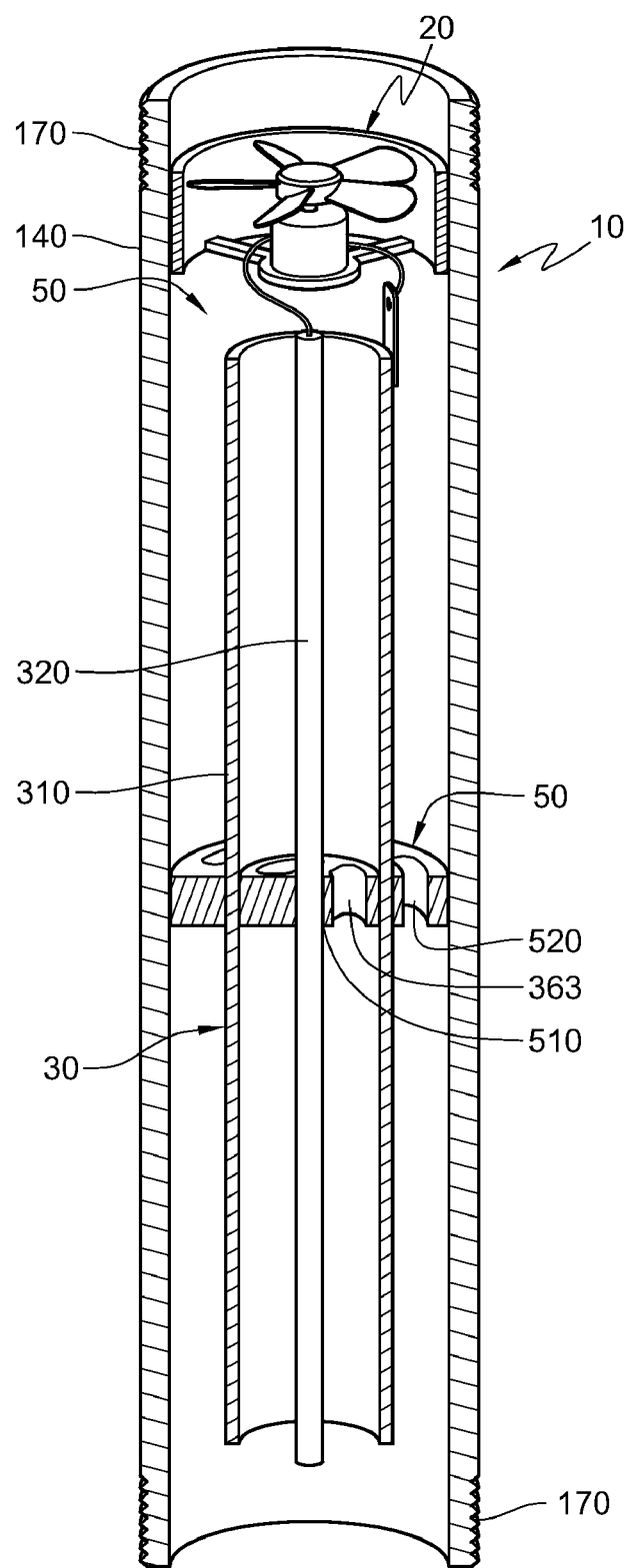
FIG. 13 is a schematic assembly view illustrating the arrangement of only one stopper in the second embodiment of the present invention.
Figure 14:
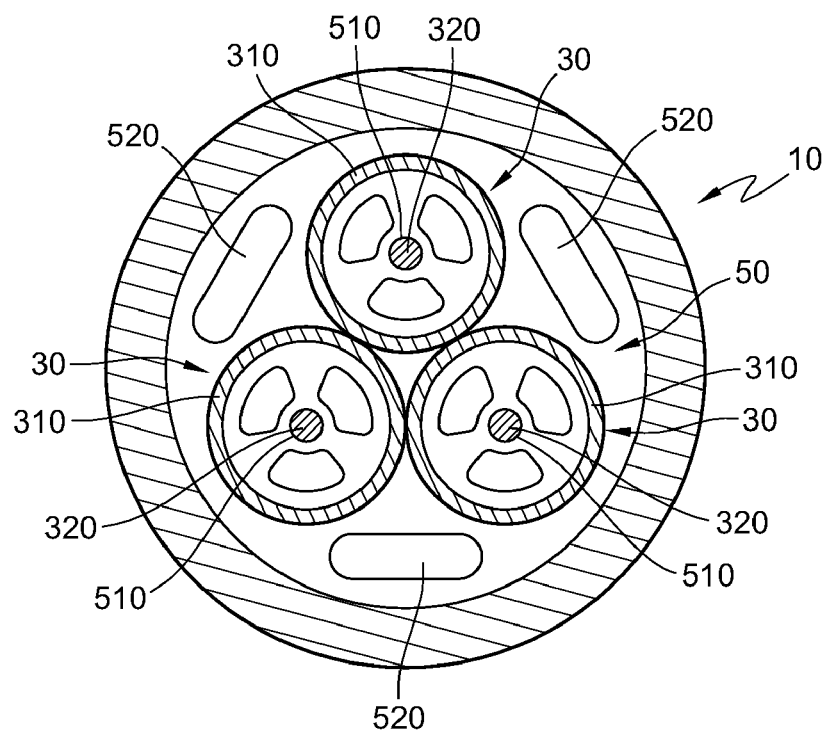
FIG. 14 is a schematic cross-sectional view illustrating the arrangement of a plurality of electrolysis units in the second embodiment of the present invention.
Figure 15:
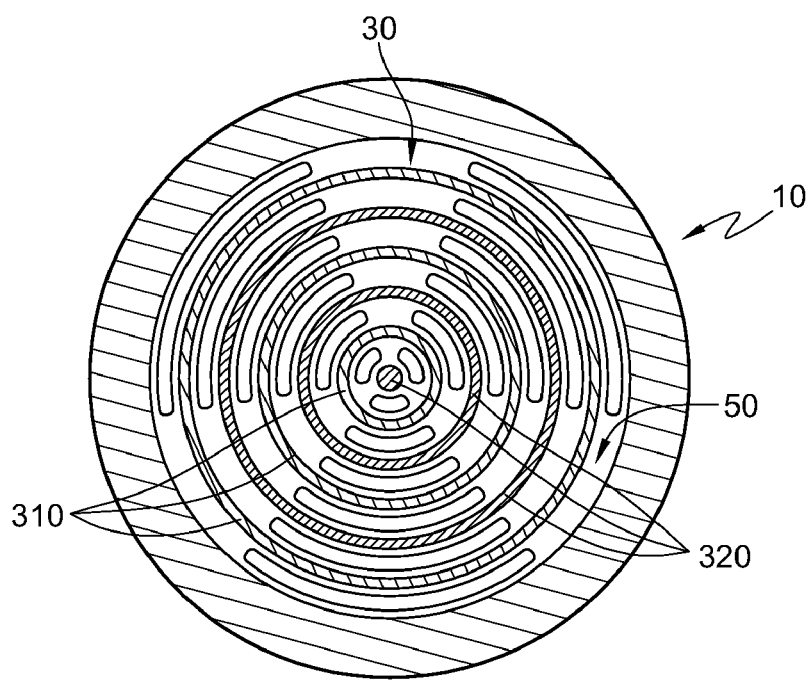
FIG. 15 is a schematic cross-sectional view illustrating the electrolysis unit having a plurality of cathode portions and anode portions in the second embodiment of the present invention.

In addition, as shown in FIG. 13, the arrangement of a single stopper 50 may also be employed in the second embodiment disclosed in the present invention, so that the anode portion 320 and the cathode portion 310 of the electrolysis unit 30 respectively pass through the perforation 510 and the positioning hole 520 of the stopper 50, and are fixed in the hollow tube 10 through the stopper 50. Moreover, the number of the perforation 510 and the positioning hole 520 of the stopper 50 may be selectively increased, so as to arrange a plurality of electrolysis units 30 in the hollow tube 10, as shown in FIG. 14; or as shown in FIG. 15, to increase the arrangement number of the cathode portions 310 and the anode portions 320 of the electrolysis unit 30 so as to arrange the anode portions 320 and the cathode portions 310 in a staggered manner, that is, arrange the anode portion 320, the cathode portion 310, the anode portion 320, the cathode portion 310, the anode portion 320, the cathode portion 310, and so on sequentially from the central position of the stopper 50 towards the hollow tube 10, thereby increasing the overall surface area of the cathode portions 310 and enhancing the electrolysis efficiency of the electrolysis unit 30.

Similarly, after the water body self-generating electrolytic reduction module disclosed in the second embodiment is assembled, a power generation rate of the water body self-generating electrolytic reduction module is tested. When a water body containing free residual chlorine flows from the first end 110 of the hollow tube 10 into the accommodating space 150 through the transportation of a ½ inch pipe (not shown), the water body containing the free residual chlorine impacts a blade 230 of the self-generating unit 20 and drives the blade 230 to rotate at the same time, so as to drive the self-generating unit 20 to generate an electric power. Moreover, an output power of the self-generating unit 20 is increased with the increase of a flow rate of the water body containing the free residual chlorine.

When the flow rate of the water body containing the free residual chlorine is increased from an initial flow rate of 0 L/min to 12.5 L/min, the output power of the electric power generated by the self-generating unit 20 may also be increased from 0 mW to near 1100 mW. Moreover, when the flow rate of the water body exceeds 6.6 L/min, an electric quantity of 139 mW required for the electrolysis unit to perform an electrolytic reduction on the free residual chlorine can also be supplied. Therefore, in the water body self-generating electrolytic reduction module disclosed in the present invention, the power generation rate of the self-generating unit 20 can be greatly increased by changing the way of fixing the electrolysis unit 30 in the hollow tube 10, and since a low water body flow rate can achieve the electric quantity required for the electrolytic reduction operation, the water body consumption is reduced.

Figure 16:
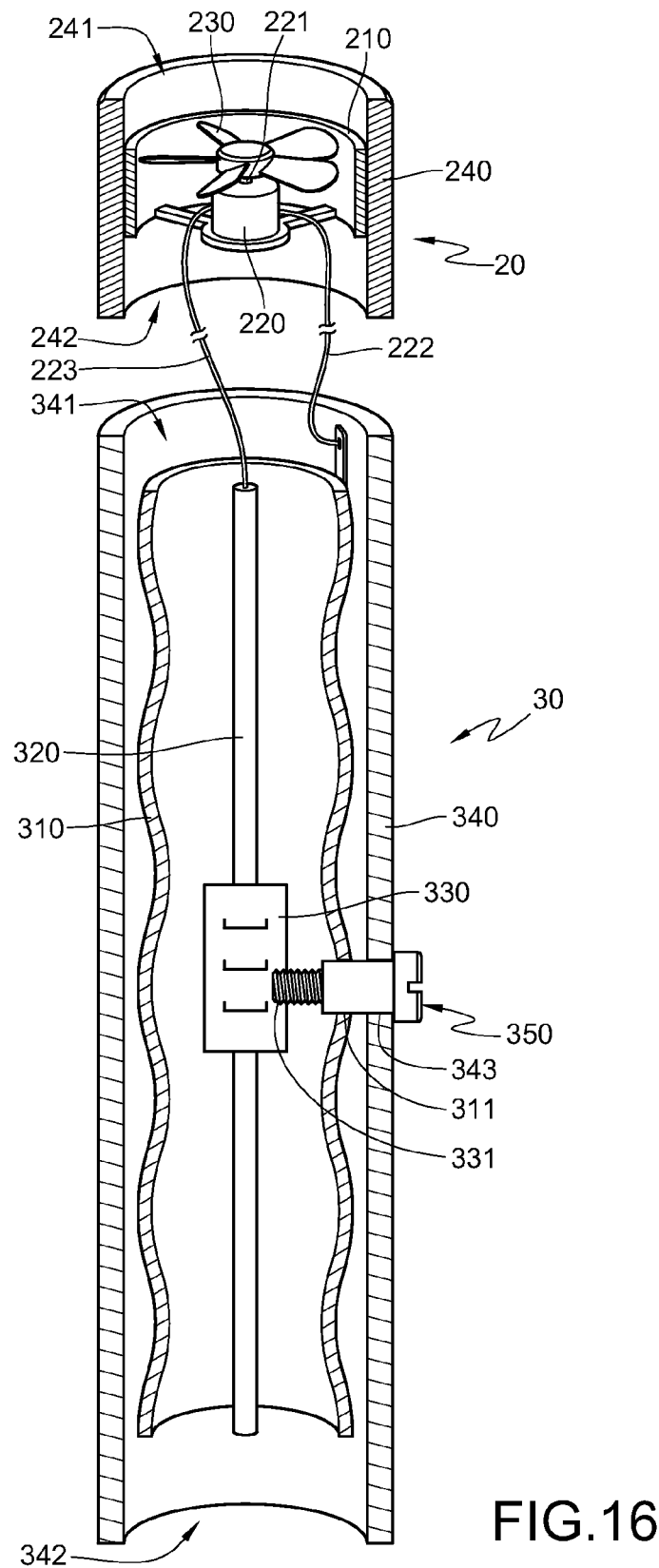
FIG. 16 is a schematic cross-sectional view of a third embodiment of the present invention.

As shown in FIG. 16, a water body self-generating electrolytic reduction module disclosed in a third embodiment of the present invention is arranged in a water transmission pipeline (not shown). The water body self-generating electrolytic reduction module comprises a self-generating unit 20 and an electrolysis unit 30. The self-generating unit 20 has a first case 240, a body 220, and a blade 230. The first case 240 is a hollow tube. Two opposite side faces of the first case 240 respectively have a water inlet 241 and a water outlet 242, and a frame 210 is disposed in the first case 240.

The body 220 is arranged on the frame 210, and is suspended in the first case 240. The body 220 has a stator, a rotor, and a rectifier circuit module (not shown) therein. The stator is connected to the rectifier circuit module, and has an induction coil. The rotor has a permanent magnet, and is movably inserted in the induction coil. The body 220 further has a rotary shaft 221, a negative lead 222, and a positive lead 223. One end of the rotary shaft 221 is movably inserted in the body 220 and connected to the rotor, and the other end of the rotary shaft 221 protrudes from the body 220 and is connected to the blade 230. The blade 230 may be configured as a screw blade or turbine blade. The negative lead 222 and the positive lead 223 each have one end connected to the rectifier circuit module of the body 220, and the other end connected to the electrolysis unit 30.

The self-generating unit 20 drives the rotary shaft 221 to rotate by the blade 230, so that the rotor rotates relative to the stator, thus generating an electric power in a magnetic power generation manner, and the electric power is converted into a direct current by the rectifier circuit module and then output to the electrolysis unit 30 through the negative lead 222 and the positive lead 223. Since the principle of magnetic power generation in which the permanent magnet and the induction coil interact to generate the electric power and the structural setup of the self-generating unit 20 belong to the conventional art, the detailed structure and operating principle thereof will not be described herein again.

The electrolysis unit 30 has a second case 340, a cathode portion 310, an anode portion 320, a jacket 330, and a fixing member 350. The second case 340 is another hollow tube. The second case 340 also has a water inlet 341 and a water outlet 342, and is provided with a combination hole 343 on a side face thereof. The cathode portion 310, the anode portion 320, and the jacket 330 are disposed in the second case 340. The cathode portion 310 and the anode portion 320 are respectively coupled to the negative lead 222 and the positive lead 223 of the self-generating unit 20. A material constituting the cathode portion 310 is metal (such as stainless steel) or graphite to which a reduction reaction easily occurs, while a material constituting the anode portion 320 is metal (such as iridium, ruthenium, and palladium) to which an oxidation reaction easily occurs. The cathode portion 310 is a wave-shaped cathode plate having a plate-like structure, and the anode portion 320 is an anode bar having a columnar structure. The cathode portion 310 is annularly disposed in the second case 340, and located between the anode portion 320 and the second case 340.

In addition, the cathode portion 310 has a plurality of through holes 311 respectively corresponding to the plurality of combination holes 160 of the second case 340. The anode portion 320 passes through and is fixed on the jacket 330, and the jacket 330 further has a plurality of fixing holes 331. The fixing member 350 passes through the combination holes 343 of the second case 340 and the through holes 311 of the cathode portion 310 sequentially, and then passes through and is fixed in the fixing holes 331 of the jacket 330, so that the electrolysis unit 30 is fixed in the second case 340.

Referring to FIG. 16, in the application of the water body self-generating electrolytic reduction module, the self-generating unit 20 and the electrolysis unit 30 may be respectively arranged in a water transmission pipeline (not shown), for example, the self-generating unit 20 is arranged at a water inlet end of the water transmission pipeline and the electrolysis unit 30 is arranged at a water outlet end of the water transmission pipeline, or the self-generating unit 20 and the electrolysis unit 30 are respectively arranged at the water outlet end and the water inlet end. The above is merely different arrangement positions of the self-generating unit 20 and the electrolysis unit 30 in the water transmission pipeline, instead of limitation of the present invention. In the third embodiment of the present invention, respective arrangement of the self-generating unit 20 and the electrolysis unit 30 at the water inlet end and the water outlet end of the water transmission pipeline is taken for illustration.

Therefore, when a water body (not shown) containing free residual chlorine flows in the water transmission pipeline and circulates through the self-generating unit 20 and the electrolysis unit 30, the water body containing the free residual chlorine impacts the blade 230 of the self-generating unit 20 and drives the blade 230 to rotate, so as to drive the self-generating unit 20 to generate an electric power. Thereafter, the electric power is output to the electrolysis unit 30 through the negative lead 222 and the positive lead 223 and is received by the cathode portion 310 and the anode portion 320 of the electrolysis unit 30, so as to perform electrolysis, so that a reduction reaction occurs to the free residual chlorine contained in the water body containing the free residual chlorine at the cathode portion 310 to form chloride ions which are stable and difficult to harm human body. Thus, when the water body containing the free residual chlorine flows out from the water outlet end of the water transmission pipeline, the content of the free residual chlorine in the water body can be greatly reduced, so that the harm of the free residual chlorine existing in the water body to the human body is reduced to the lowest degree.

Figure 17:
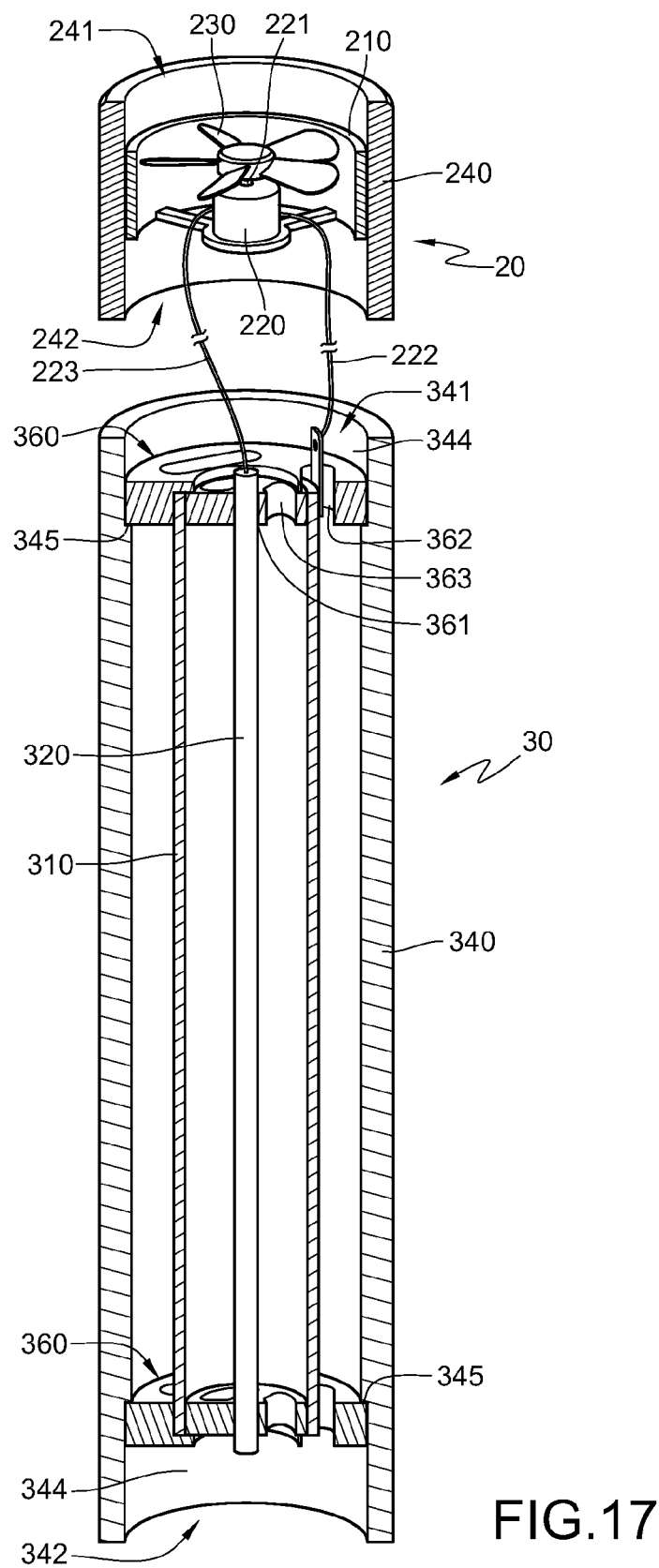
FIG. 17 is a schematic cross-sectional view of an electrolysis unit having two stoppers in the third embodiment of the present invention.

Further, in the third embodiment disclosed in the present invention, the cathode portion 310 and the anode portion 320 of the electrolysis unit 30 may also be fixed in the second case 340 in other ways. As shown in FIG. 17, the electrolysis unit 30 comprises a second case 340, two stoppers 360, a cathode portion 310, and an anode portion 320. A combination portion 344 is respectively arranged at positions adjacent to the water inlet 341 and the water outlet 342 in the second case 340. Moreover, a diameter of the two combination portions 344 is greater than that of other areas in the second case 340, so that a leaning face 345 is formed at a position where the combination portion 344 is connected to other areas.

The two stoppers 360 have an oval support ring structure, and an outside diameter thereof matches the diameter of the combination portions 344 of the second case 340. When the two stoppers 360 are respectively arranged at the two combination portions 344, the two stoppers 360 lean against the leaning faces 345, and are fixed in the second case 340 with their outside faces pressing against the combination portions 344. The stopper 360 has a perforation 361, a plurality of positioning holes 362, and a plurality of flow holes 363, and the perforation 361, the plurality of positioning holes 362, and the plurality of flow holes 363 all run through the stopper 360. The perforation 361 is disposed at a central position of the stopper 360, and the plurality of positioning holes 362 and the plurality of flow holes 363 surround the perforation 361. When the water body (not shown) flows from the water inlet 341 towards the water outlet 342 of the second case 340, the water body circulates in the second case 340 through the plurality of positioning holes 362 and the plurality of flow holes 363.

Two ends of the anode portion 320 of the electrolysis unit 30 respectively pass through and are fixed in the perforations 361 of the two stoppers 360, and two ends of the cathode portion 310 respectively pass through and are fixed in the positioning holes 362 of the two stoppers 360, so that the cathode portion 310 and the anode portion 320 are clamped by the two stoppers 360 to be fixed in the second case 340.

Figure 18:
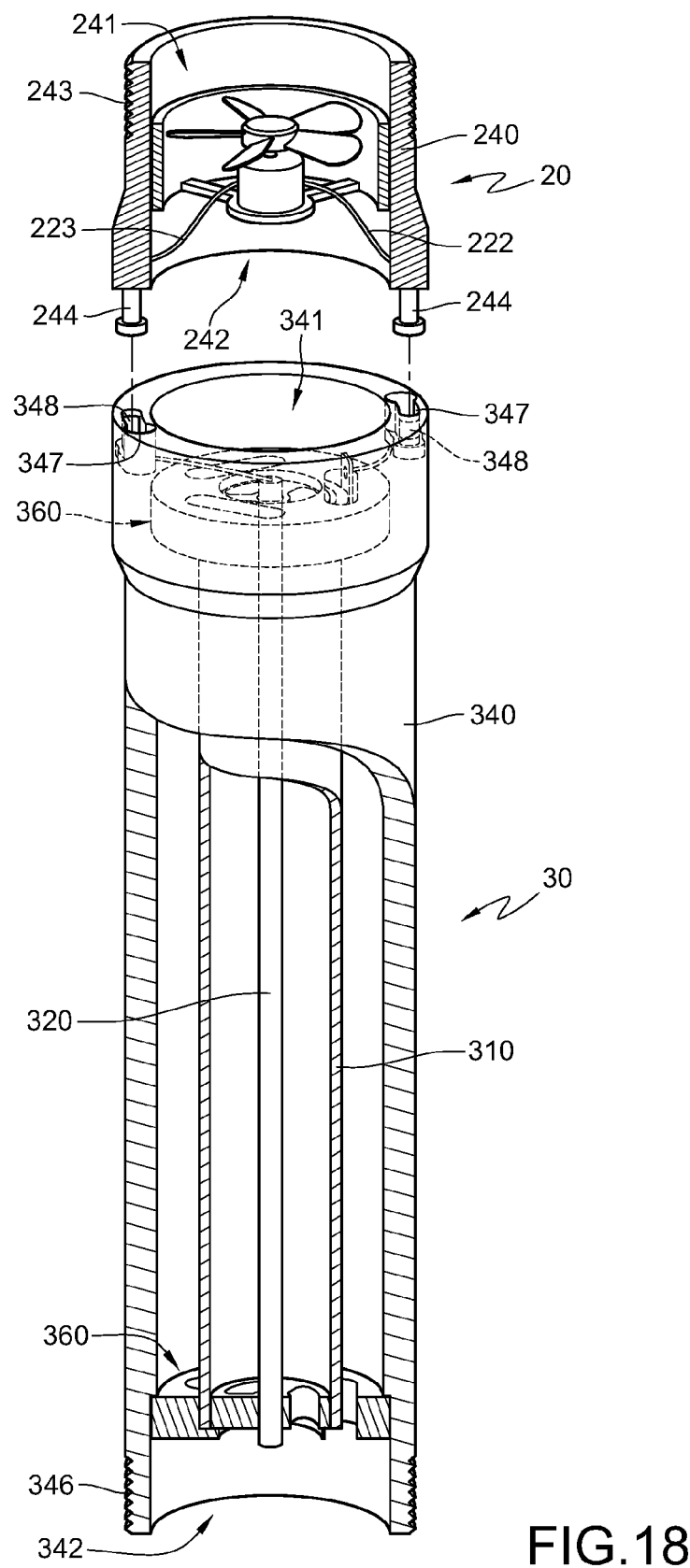
FIG. 18 is a schematic exploded view of a fourth embodiment of the present invention.
Figure 19:
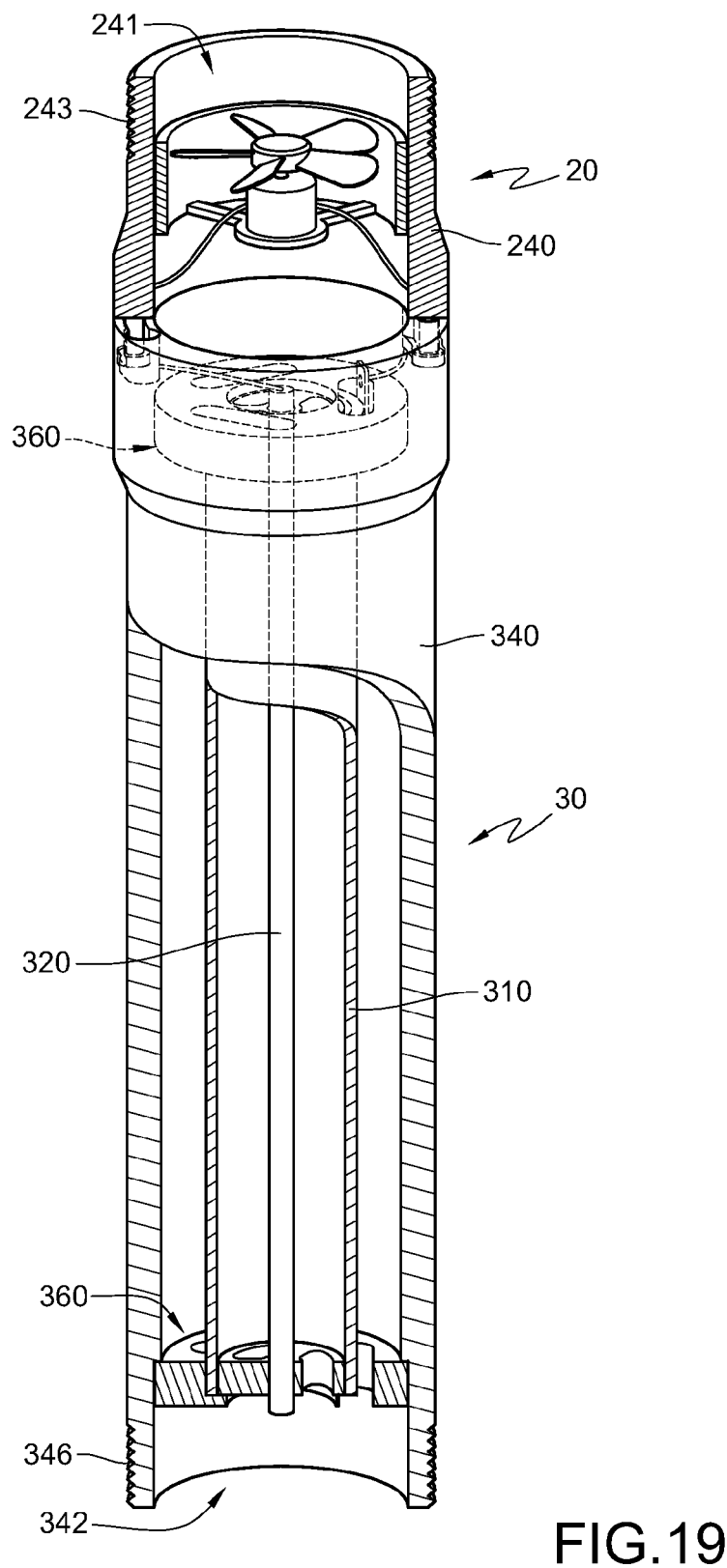
FIG. 19 is a schematic assembly view of the fourth embodiment of the present invention.

FIGS. 18 and 19 are a schematic exploded view and a schematic assembly view of a fourth embodiment disclosed in the present invention. The fourth embodiment disclosed in the present invention is substantially the same as the third embodiment in structure, and only the difference there-between is illustrated below. A water body self-generating electrolytic reduction module disclosed in the fourth embodiment of the present invention comprises a self-generating unit 20 and an electrolysis unit 30. A plurality of threads 243 is arranged on a side of a surface of a first case 240 of the self-generating unit 20 adjacent to a water inlet 241, and two snapping members 244 are arranged on an end face of the first case 240 adjacent to a water outlet 242. The two snapping members 244 have two opposite ends, and a diameter of one end connected to the first case 240 is smaller than that of the other end. In this embodiment, the two sapping members 244 are two electrical connectors, and are respectively coupled to a negative lead 222 and a positive lead 223.

In addition, a plurality of threads 346 is arranged on a side of a surface of a second case 340 of the electrolysis unit 30 adjacent to the water outlet 342, and two fastening slots 347 are arranged on an end face of the second case 340 adjacent to the water inlet 341. The two fastening slots 347 each have two opposite ends, and an aperture of one end is smaller than that of the other end, and an electrical contact 348 is arranged at the end having the smaller aperture. The electrical contacts 348 of the two fastening slots 347 are respectively coupled to a cathode portion 310 and an anode portion 320 of the electrolysis unit 30.

Therefore, in the arrangement of the water body self-generating electrolytic reduction module, the two snapping members 244 of the self-generating unit 20 respectively pass through the two fastening slots 347 of the electrolysis unit 30, then, the self-generating unit 20 is rotated relative to the electrolysis unit 30 by an angle so that the two snapping members 244 are respectively fastened to the two fastening slots 347 and contact the electrical contacts 348, thereby connecting the self-generating unit 20 to the electrolysis unit 30 with the water outlet 242 of the self-generating unit 20 connected to the water inlet 341 of the electrolysis unit 30 and meanwhile forming a coupling state between the self-generating unit 20 and the electrolysis unit 30.

When arranged in a water transmission pipeline (not shown), the water body self-generating electrolytic reduction module is connected in series to the water transmission pipeline by respectively engaging the threads 243 and 346 of the self-generating unit 20 and the electrolysis unit 30 with threads of the water transmission pipeline, the self-generating unit 20 generates an electric power when a water body containing free residual chlorine circulates through the self-generating unit 20 and the electrolysis unit 30, and electrolysis is performed on the water body containing the free residual chlorine after the electrolysis unit 30 receives the electric power generated by the self-generating unit 20, so as to reduce the content of the free residual chlorine in the water body.

Figure 20:
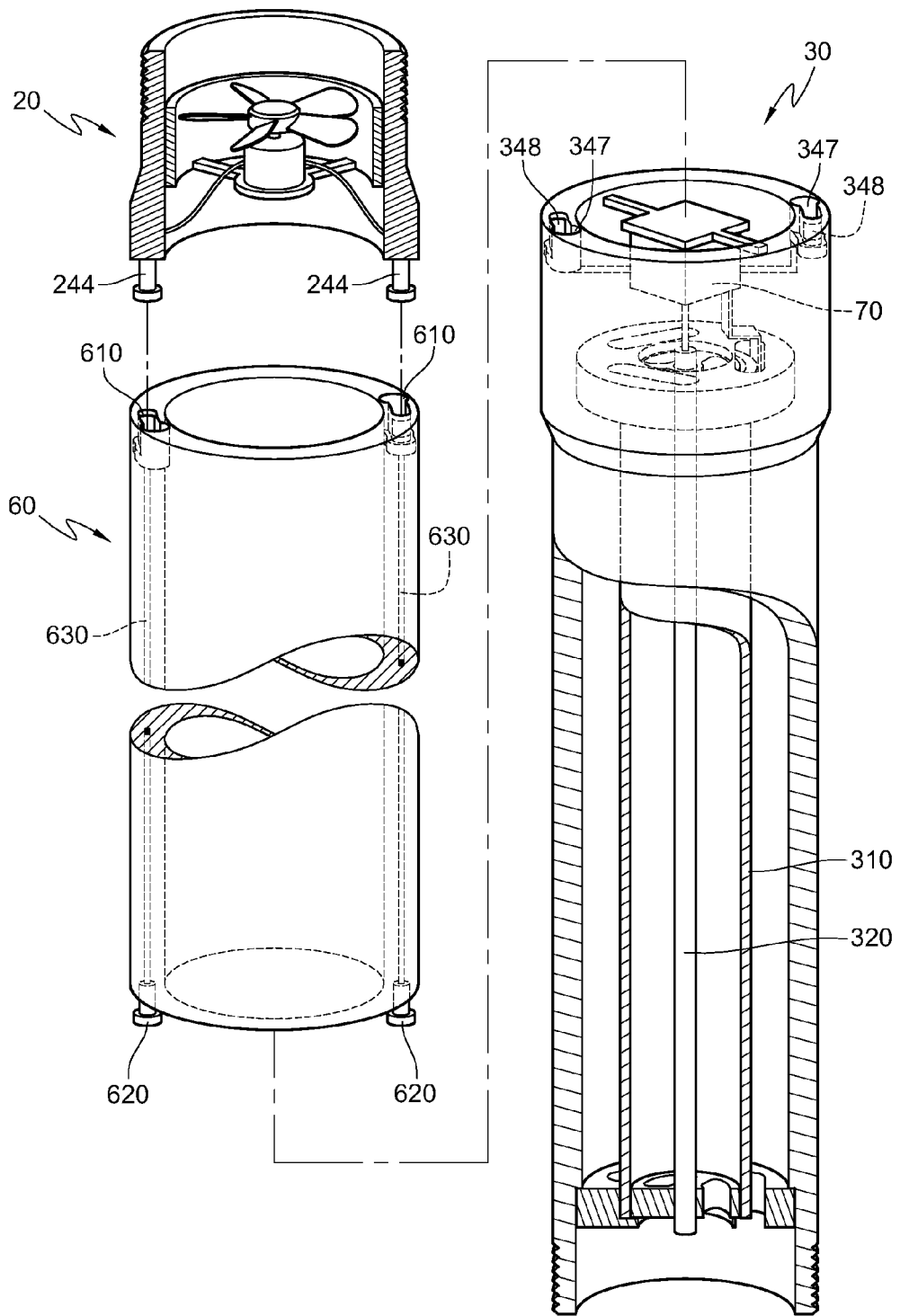
FIG. 20 is a schematic exploded view illustrating a connecting tube comprised in the fourth embodiment of the present invention.

As shown in FIG. 20, in the fourth embodiment disclosed in the present invention, the water body self-generating electrolytic reduction module may further comprise a connecting tube 60, so that a length of the water body self-generating electrolytic reduction module is adjustable with the connecting tube 60. The connecting tube 60 is a hollow tube. Two electrical connecting holes 610 are arranged at an end of the connecting tube 60 opposite to the self-generating unit 20, and two electrical connectors 620 are arranged at an end of the connecting tube 60 opposite to the electrolysis unit 30. The two electrical connecting holes 610 are respectively coupled to the two electrical connectors 620 through electrical connecting lines 630. The form of the electrical connecting holes 610 is the same as that of the fastening slots 347 of the electrolysis unit 30, and the form of the electrical connectors 620 is the same as that of the snapping members 244 of the self-generating unit 20.

Therefore, in the arrangement of the water body self-generating electrolytic reduction module, the two electrical connecting holes 610 of the connecting tube 60 may be fastened to the two snapping members 244 of the self-generating unit 20, and the two electrical connectors 620 of the connecting tube 60 may be snapped in the two fastening slots 347 of the electrolysis unit 30, so that the self-generating unit 20 and the electrolysis unit 30 may form a coupling state through the connecting tube 60.

In addition, a rectifier 70 may further be disposed in the second case 340 of the electrolysis unit 30, and a rectifier circuit module may be omitted in the self-generating unit 20. The rectifier 70 is coupled to the two electrical contacts 348 of the electrolysis unit 30, so that the electric power generated by the self-generating unit 20 is converted into a direct current by the rectifier 70 after being transferred to the rectifier 70 through the connecting tube 60 in the form of an alternating current, and then the direct current is supplied to the cathode portion 310 and the anode portion 320. Therefore, the loss of the electric power in the delivery may be reduced, and the snapping members 244 of the self-generating unit 20, the electrical connecting holes 610 and the electrical connectors 620 of the connecting tube 60, and the electrical contacts 348 of the electrolysis unit 30 may be prevented from polarization, thus providing sufficient electric power to the electrolysis unit 30 to perform electrolysis on the water body containing the free residual chlorine.

In the water body self-generating electrolytic reduction module disclosed in the present invention, the self-generating unit and the electrolysis unit are arranged in the hollow tube, and structural sizes of the hollow tube, the self-generating unit, and the electrolysis unit may be arranged depending on a structural size of a water transmission pipeline to which the module is to be connected in series; or the self-generating unit and the electrolysis unit are directly arranged in the water transmission pipeline while omitting the hollow tube. As a result, the water body self-generating electrolytic reduction module can be widely applied to water transmission pipelines of various sizes, for example, water transmission pipelines of industrial wastewater or domestic water. Moreover, since the water body self-generating electrolytic reduction module is directly connected in series to or directly arranged in the water transmission pipeline, it does not occupy the use space of peripheral environment after the connection in series or arrangement.

Meanwhile, when a water body containing an oxidizing substance to be processed circulates in the hollow tube or the water transmission pipeline, the water body drives the self-generating unit to generate an electric power and causes the electrolysis unit to perform an electrolytic reduction action on the oxidizing substance in the water body, so the oxidizing substance in the water body is removed during the transportation of the water body containing the oxidizing substance. Since other adsorbents or chemical agents are not required to be used in this process, the problem that the adsorbents and chemical agents contaminate the water quality can be effectively avoided.

In addition, due to the self-generating characteristics and simple structure of the water body self-generating electrolytic reduction module, the water body self-generating electrolytic reduction module can be widely installed (applied) in various environments lacking power supplies, so as to enhance the applicability and convenience in use of the water body self-generating electrolytic reduction module.

What is claimed is:

1. A water body self-generating electrolytic reduction module, applied to a water transmission pipeline having a water body containing an oxidizing substance circulating therein, comprising:
   a self-generating unit, having a blade, and generating an electric power when the blade rotates, wherein the self-generating unit is arranged in the water transmission pipeline, so that the water body drives the blade to rotate when the water body circulates in the water transmission pipeline; and
   an electrolysis unit, arranged in the water transmission pipeline so that the water body circulates in the electrolysis unit, wherein the electrolysis unit is coupled to the self-generating unit and electrolyzes the water body after receiving the electric power, so that a reduction reaction occurs to the oxidizing substance,
   wherein the self-generating unit has a negative lead and a positive lead, the electrolysis unit has at least one cathode portion and at least one anode portion, the negative lead and the positive lead are respectively coupled to the cathode portion and the anode portion, and the electrolysis unit receives the electric power through the negative lead and the positive lead; and
   wherein the self-generating unit further has two snapping members, the electrolysis unit further has two fastening slots, and the self-generating unit is connected to the electrolysis unit by detachably snapping the two snapping members in the two fastening slots.

2. The water body self-generating electrolytic reduction module according to claim 1, wherein the electrolysis unit further has a case, the cathode portion and the anode portion are disposed in the case, the case further has a water inlet and a water outlet, the case is arranged in the water transmission pipeline, and the water body circulates from the water inlet to the water outlet.

3. The water body self-generating electrolytic reduction module according to claim 2, wherein the electrolysis unit further has at least one fixing member, and the fixing member passes through the case and the cathode portion and is fixed in the anode portion.

4. The water body self-generating electrolytic reduction module according to claim 3, wherein the electrolysis unit adjusts a position of the anode portion in the case by the fixing member.

5. The water body self-generating electrolytic reduction module according to claim 3, wherein the electrolysis unit has a plurality of the fixing members, and the plurality of the fixing members respectively pass through the case and the cathode portion and are clamped and fixed at two opposite sides of the anode portion.

6. The water body self-generating electrolytic reduction module according to claim 2, wherein the electrolysis unit further comprises at least one stopper arranged in the case, and the cathode portion and the anode portion are fixed on the stopper.

7. The water body self-generating electrolytic reduction module according to claim 6, wherein the stopper has at least one perforation and at least one positioning hole, an end of the anode portion passes through and is fixed in the perforation, and an end of the cathode portion passes through and is fixed in the positioning hole.

8. The water body self-generating electrolytic reduction module according to claim 7, wherein the perforation is located at a central position of the stopper, and the positioning holes surround the perforation.

9. The water body self-generating electrolytic reduction module according to claim 6, wherein the stopper has at least one flow hole, and the water body is capable of circulating to the cathode portion and the anode portion through the flow hole.

10. The water body self-generating electrolytic reduction module according to claim 6, wherein the electrolysis unit comprises two stoppers respectively disposed at ends of the case adjacent to the water inlet and the water outlet, and the cathode portion and the anode portion are arranged between the two stoppers.

11. The water body self-generating electrolytic reduction module according to claim 2, wherein the cathode portion is annularly disposed in the case and located between the case and the anode portion.

12. The water body self-generating electrolytic reduction module according to claim 2, wherein the self-generating unit further has a case for accommodating the blade, the negative lead and the positive lead, the case of the self-generating unit is connected with the case of the electrolysis unit to form a hollow tube, wherein the water body circulates in the hollow tube from the water transmission pipeline.

13. The water body self-generating electrolytic reduction module according to claim 1, wherein the two snapping members are electrical connectors and are respectively coupled to the negative lead and the positive lead, an electrical contact is respectively arranged in the two fastening slots, the cathode portion and the anode portion are respectively coupled to the two electrical contacts, and the two snapping members are coupled to the two electrical contacts when the self-generating unit is connected to the electrolysis unit.

14. The water body self-generating electrolytic reduction module according to claim 13, further comprising a connecting tube, the connecting tube is detachably connected between the self-generating unit and the electrolysis unit, and the self-generating unit is coupled to the electrolysis unit through the connecting tube.

15. The water body self-generating electrolytic reduction module according to claim 14, wherein two electrical connecting holes are arranged at one end of the connecting tube, two electrical connectors are arranged at an other end of the connecting tube, the two electrical connecting holes are respectively coupled to the two electrical connectors and respectively fitted on the two snapping members of the self-generating unit, and the two electrical connectors are respectively snapped in the two fastening slots of the electrolysis unit.

16. The water body self-generating electrolytic reduction module according to claim 1, further comprising a rectifier, wherein the negative lead and the positive lead are respectively coupled to the cathode portion and the anode portion through the rectifier.

17. The water body self-generating electrolytic reduction module according to claim 1, wherein a gap exists between the cathode portion and the anode portion.

18. The water body self-generating electrolytic reduction module according to claim 1, wherein the cathode portion has a mesh structure.

19. The water body self-generating electrolytic reduction module according to claim 1, wherein the cathode portion and the anode portion respectively have an effective reaction area, and a ratio between the effective reaction area of the cathode portion and the effective reaction area of the anode portion is between 4.5:1 and 10:1.

20. The water body self-generating electrolytic reduction module according to claim 1, wherein the cathode portion is a cathode plate and the anode portion is an anode bar.

21. A water body self-generating electrolytic reduction module, applied to a water transmission pipeline having a water body containing an oxidizing substance circulating therein, comprising:
- a self-generating unit, having a blade, and generating an electric power when the blade rotates, wherein the self-generating unit is arranged in the water transmission pipeline, so that the water body drives the blade to rotate when the water body circulates in the water transmission pipeline; and
- an electrolysis unit, arranged in the water transmission pipeline so that the water body circulates in the electrolysis unit, wherein the electrolysis unit is coupled to the self-generating unit and electrolyzes the water body after receiving the electric power, so that a reduction reaction occurs to the oxidizing substance,
- wherein the self-generating unit has a negative lead and a positive lead, the electrolysis unit has at least one cathode portion and at least one anode portion, the negative lead and the positive lead are respectively coupled to the cathode portion and the anode portion, and the electrolysis unit receives the electric power through the negative lead and the positive lead; and
- wherein the electrolysis unit further has a case and at least one fixing member, the cathode portion and the anode portion are disposed in the case, the case further has a water inlet and a water outlet, the case is arranged in the water transmission pipeline, the water body circulates from the water inlet to the water outlet, and the fixing member passes through the case and the cathode portion and is fixed in the anode portion.

\* \* \* \* \*